United States Patent
Lee et al.

(10) Patent No.: US 12,238,730 B2
(45) Date of Patent: Feb. 25, 2025

(54) METHOD FOR TRANSMITTING DOWNLINK CONTROL INFORMATION AND BASE STATION, METHOD FOR RECEIVING DOWNLINK CONTROL INFORMATION, USER EQUIPMENT, AND STORAGE MEDIUM

(71) Applicant: LG Electronics Inc., Seoul (KR)

(72) Inventors: Hyunho Lee, Seoul (KR); Seonwook Kim, Seoul (KR); Duckhyun Bae, Seoul (KR)

(73) Assignee: LG Electronics Inc., Seoul (KR)

(*) Notice: Subject to any disclaimer, the term of this patent is extended or adjusted under 35 U.S.C. 154(b) by 645 days.

(21) Appl. No.: 17/437,276

(22) PCT Filed: Mar. 27, 2020

(86) PCT No.: PCT/KR2020/004204
§ 371 (c)(1),
(2) Date: Sep. 8, 2021

(87) PCT Pub. No.: WO2020/204486
PCT Pub. Date: Oct. 8, 2020

(65) Prior Publication Data
US 2022/0167320 A1    May 26, 2022

(30) Foreign Application Priority Data

Mar. 29, 2019    (KR) .................. 10-2019-0037418
May 2, 2019    (KR) .................. 10-2019-0051777
Aug. 15, 2019    (KR) .................. 10-2019-0100010

(51) Int. Cl.
*H04W 72/23*    (2023.01)

(52) U.S. Cl.
CPC ................... *H04W 72/23* (2023.01)

(58) Field of Classification Search
CPC .................................... H04W 72/23
See application file for complete search history.

(56) References Cited

U.S. PATENT DOCUMENTS

| | | | |
|---|---|---|---|
| 2012/0327917 A1* | 12/2012 | Yang ............ | H04L 69/324 370/336 |
| 2014/0105154 A1* | 4/2014 | Yang ............ | H04L 5/0053 370/329 |
| 2014/0211722 A1* | 7/2014 | Pietraski ....... | H04L 5/0005 370/329 |

(Continued)

FOREIGN PATENT DOCUMENTS

EP    3327972    5/2018

OTHER PUBLICATIONS

LG Electronics, "PDCCH enhancements for NR URLLC," R1-1902045, Presented at 3GPP TSG RAN WG1 Meeting #96, Athens, Greece, Feb. 25-Mar. 1, 2019, 7 pages.

(Continued)

*Primary Examiner* — Ajay Cattungal
(74) *Attorney, Agent, or Firm* — Fish & Richardson P.C.

(57) ABSTRACT

A user equipment that has performed a random access procedure with respect to a base station may determine a DCI size to be monitored based on DCI size alignment and the base station may determine a DCI size to be used based on the DCI size alignment. The DCI size alignment may include aligning the size of a legacy UL DCI format and the size of a legacy DL DCI format after aligning the size of a new UL DCI format and the size of a new DL UCI format. Each of the new UL DCI format and the legacy UL DCI format is a DCI format used to schedule a physical uplink shared channel (PUSCH), and each of the new DL DCI format and the legacy DL DCI format is a DCI format used to schedule a physical downlink shared channel (PDSCH).

18 Claims, 19 Drawing Sheets

(56) References Cited

U.S. PATENT DOCUMENTS

| | | | |
|---|---|---|---|
| 2014/0314007 A1 | 10/2014 | Chen et al. | |
| 2015/0223208 A1* | 8/2015 | Park | H04W 72/30 370/329 |
| 2016/0007374 A1* | 1/2016 | Lee | H04L 1/0072 370/336 |
| 2017/0111217 A1* | 4/2017 | Kim | H04W 72/23 |
| 2017/0230994 A1* | 8/2017 | You | H04L 5/0053 |
| 2018/0324850 A1 | 11/2018 | Amuru et al. | |

OTHER PUBLICATIONS

Office Action in Japanese Appln. No. 2021-557873, mailing date Nov. 29, 2022, 6 pages (with English translation).
Ericsson, "PDCCH enhancements for NR URLLC," Tdoc R1-1901593, Presented at 3GPP TSG-RAN WG1 Meeting #96, Athens, Greece, Feb. 25- Mar. 1, 2019, 14 pages.
Huawei, "Summary of 7.2.6.1.1 Potential enhancements to PDCCH," R1-1903349, 3GPP TSG RAN WG1 Meeting #96, Athens, Greece, Feb. 25-Mar. 1, 2019, 39 pages.
International Search Report and Written Opinion in International Appln. No. PCT/KR2020/004204, dated Jul. 17, 2020, 16 pages (with English translation).
Vivo, "PDCCH enhancements for URLLC," R1- 1901692, Presented at 3GPP TSG RAN WG1 #96, Athens, Greece, Feb. 25-Mar. 1, 2019, 7 pages.
ZTE, "On PDCCH enhancements for URLLC," R1-1901767, Presented at 3GPP TSG RAN WG1 #96, Athens, Greece, Feb. 25-Mar. 1, 2019, 10 pages.
Ericsson, "Offline discussion on maintenance of DCI contents and formats," R1-1903462, Presented at TSG-RAN WG1 #96, Athens, Greece, Feb. 25-Mar. 1, 2019, 9 pages.
Extended European Search Report in European Appln. No. 20783323. 7, dated Mar. 30, 2022, 10 pages.

* cited by examiner

FIG. 5
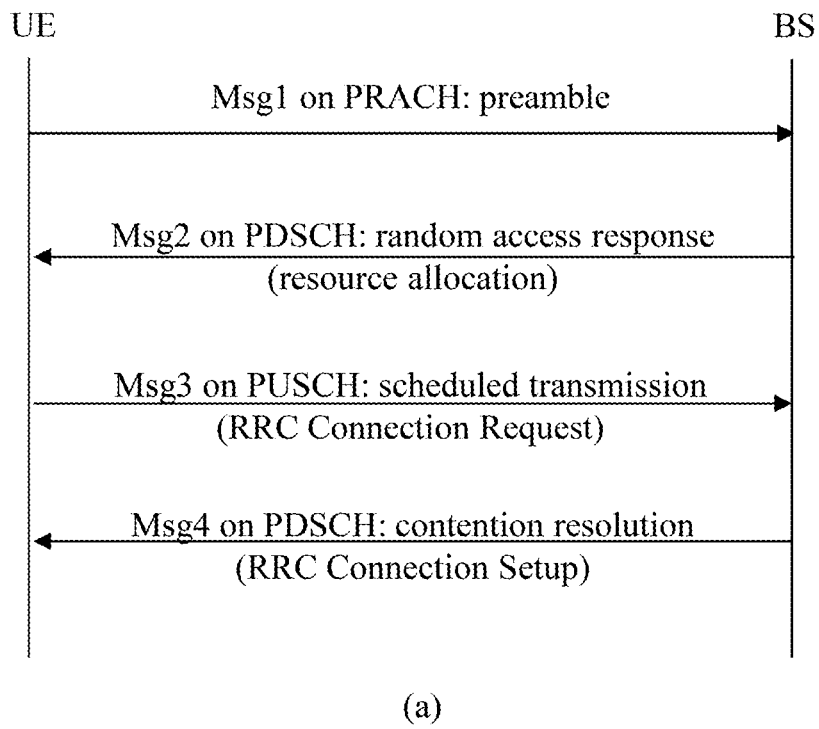
(a)
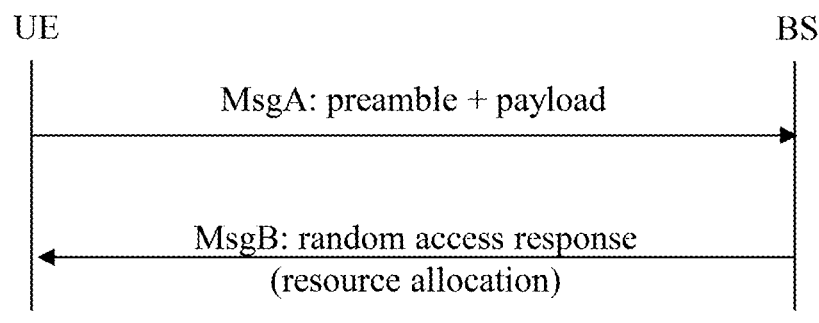
(b)

METHOD FOR TRANSMITTING DOWNLINK CONTROL INFORMATION AND BASE STATION, METHOD FOR RECEIVING DOWNLINK CONTROL INFORMATION, USER EQUIPMENT, AND STORAGE MEDIUM

CROSS-REFERENCE TO RELATED APPLICATIONS

This application is a National Stage application under 35 U.S.C. § 371 of International Application No. PCT/KR2020/004204, filed on Mar. 27, 2020, which claims the benefit of Korean Application Nos. 10-2019-0100010, filed on Aug. 15, 2019, 10-2019-0051777, filed on May 2, 2019, and 10-2019-0037418, filed on Mar. 29, 2019. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at any time and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

According to an aspect of the present disclosure, provided herein is a method of transmitting downlink control information (DCI) by a base station (BS) in a wireless communication system. The method may include: transmitting one or more synchronization signal and physical broadcast channel blocks (SSBs); receiving a preamble of a random access procedure from a user equipment (UE) on a random access resource related to one of the one or more SSBs; transmitting a random access response related to the random access preamble to the UE; establishing a radio resource control (RRC) connection with the UE based on an uplink (UL) grant included in the random access response; aligning a size of a new UL DCI format and a size of a new downlink (DL) DCI format with a first DCI size, based on establishment of the RRC connection with the UE; aligning a size of a legacy UL DCI format and a size of a legacy DL DCI format with a second DCI size, based on aligning the size of the new UL DCI format and the size of the new DL DCI format with the first DCI size; and transmitting at least one DCI based on the first DCI size and the second DCI size. Each of the new UL DCI format and the legacy UL DCI format may be a DCI format used to schedule a physical uplink shared channel (PUSCH). Each of the new DL DCI format and the legacy DL DCI format may be a DCI format used to schedule a physical downlink shared channel (PDSCH).

According to another aspect of the present disclosure, provided herein is a base station (BS) for transmitting downlink control information (DCI) in a wireless communication system. The BS includes: at least one transceiver; at least one processor; and at least one computer memory operably connected to the at least one processor and configured to store instructions for causing, when executed, the at least one processor to perform operations. The operations may include: transmitting one or more synchronization signal and physical broadcast channel blocks (SSBs); receiving a preamble of a random access procedure from a user equipment (UE) on a random access resource related to one of the one or more SSBs; transmitting a random access response related to the random access preamble to the UE; establishing a radio resource control (RRC) connection with the UE based on an uplink (UL) grant included in the random access response; aligning a size of a new UL DCI format and a size of a new downlink (DL) DCI format with a first DCI size, based on establishment of the RRC connection with the UE; aligning a size of a legacy UL DCI format and a size of a legacy DL DCI format with a second DCI size, based on aligning the size of the new UL DCI format and the size of the new DL DCI format with the first DCI size; and transmitting at least one DCI based on the first DCI size and the second DCI size. Each of the new UL DCI format and the legacy UL DCI format may be a DCI format used to schedule a physical uplink shared channel (PUSCH). Each of the new DL DCI format and the legacy DL DCI format may be a DCI format used to schedule a physical downlink shared channel (PDSCH).

According to another aspect of the present disclosure, provided herein is a method of receiving downlink control information (DCI) by a user equipment (UE) in a wireless communication system. The method may include: The method may include: transmitting one or more synchronization signal and physical broadcast channel blocks (SSBs); receiving a preamble of a random access procedure from a user equipment (UE) on a random access resource related to one of the one or more SSBs; transmitting a random access response related to the random access preamble to the UE; establishing a radio resource control (RRC) connection with the UE based on an uplink (UL) grant included in the random access response; aligning a size of a new UL DCI format and a size of a new downlink (DL) DCI format with a first DCI size, based on establishment of the RRC connection with the UE; aligning a size of a legacy UL DCI format and a size of a legacy DL DCI format with a second DCI size, based on aligning the size of the new UL DCI format and the size of the new DL DCI format with the first DCI size; and transmitting at least one DCI based on the first DCI size and the second DCI size. Each of the new UL DCI format and the legacy UL DCI format may be a DCI format used to schedule a physical uplink shared channel (PUSCH). Each of the new DL DCI format and the legacy DL DCI format may be a DCI format used to schedule a physical downlink shared channel (PDSCH).

According to another aspect of the present disclosure, provided herein is a user equipment (UE) for receiving downlink control information (DCI) in a wireless communication system. The UE includes: at least one transceiver; at least one processor; and at least one computer memory operably connected to the at least one processor and configured to store instructions for causing, when executed, the at least one processor to perform operations. The operations may include: transmitting one or more synchronization signal and physical broadcast channel blocks (SSBs); receiving a preamble of a random access procedure from a user equipment (UE) on a random access resource related to one of the one or more SSBs; transmitting a random access response related to the random access preamble to the UE; establishing a radio resource control (RRC) connection with the UE based on an uplink (UL) grant included in the random access response; aligning a size of a new UL DCI format and a size of a new downlink (DL) DCI format with a first DCI size, based on establishment of the RRC connection with the UE; aligning a size of a legacy UL DCI format and a size of a legacy DL DCI format with a second DCI size, based on aligning the size of the new UL DCI format and the size of the new DL DCI format with the first DCI size; and transmitting at least one DCI based on the first DCI size and the second DCI size. Each of the new UL DCI format and the legacy UL DCI format may be a DCI format used to schedule a physical uplink shared channel (PUSCH). Each of the new DL DCI format and the legacy DL DCI format may be a DCI format used to schedule a physical downlink shared channel (PDSCH).

According to another aspect of the present disclosure, provided herein is an apparatus for a user equipment (UE). The apparatus includes at least one processor; and at least one computer memory operably connected to the at least one processor and configured to store instructions for causing, when executed, the at least one processor to perform operations The operations may include: transmitting one or more synchronization signal and physical broadcast channel blocks (SSBs); receiving a preamble of a random access procedure from a user equipment (UE) on a random access resource related to one of the one or more SSBs; transmitting a random access response related to the random access preamble to the UE; establishing a radio resource control (RRC) connection with the UE based on an uplink (UL) grant included in the random access response; aligning a size of a new UL DCI format and a size of a new downlink (DL) DCI format with a first DCI size, based on establishment of the RRC connection with the UE; aligning a size of a legacy UL DCI format and a size of a legacy DL DCI format with a second DCI size, based on aligning the size of the new UL DCI format and the size of the new DL DCI format with the first DCI size; and transmitting at least one DCI based on the first DCI size and the second DCI size. Each of the new UL DCI format and the legacy UL DCI format may be a DCI format used to schedule a physical uplink shared channel (PUSCH). Each of the new DL DCI format and the legacy DL DCI format may be a DCI format used to schedule a physical downlink shared channel (PDSCH).

According to another aspect of the present disclosure, provided herein is a computer readable storage medium. The computer readable storage medium stores at least one computer program including instructions for causing, when executed by at least one processor, the at least one processor to perform operations for a user equipment (UE), The operations may include: transmitting one or more synchronization signal and physical broadcast channel blocks (SSBs); receiving a preamble of a random access procedure from a user equipment (UE) on a random access resource related to one of the one or more SSBs; transmitting a random access response related to the random access preamble to the UE; establishing a radio resource control (RRC) connection with the UE based on an uplink (UL) grant included in the random access response; aligning a size of a new UL DCI format and a size of a new downlink (DL) DCI format with a first DCI size, based on establishment of the RRC connection with the UE; aligning a size of a legacy UL DCI format and a size of a legacy DL DCI format with a second DCI size, based on aligning the size of the new UL DCI format and the size of the new DL DCI format with the first DCI size; and transmitting at least one DCI based on the first DCI size and the second DCI size. Each of the new UL DCI format and the legacy UL DCI format may be a DCI format used to schedule a physical uplink shared channel (PUSCH). Each of the new DL DCI format and the legacy DL DCI format may be a DCI format used to schedule a physical downlink shared channel (PDSCH).

In each aspect of the present disclosure, random access resource information about a random access resource for each SSB of a cell may be provided to the UE by the BS. The BS may receive the preamble based on the random access resource information. The UE may transmit the preamble based on the random access resource information.

In each aspect of the present disclosure, the first DCI size may be one of the size of the new UL DCI format and the new DL DCI format. The second DCI size may be one of the size of the legacy UL DCI format and the legacy DL DCI format.

In each aspect of the present disclosure, the new UL DCI format may be configured to include or not to include at least one field having a fixed field size among fields in the legacy UL DCI format.

In each aspect of the present disclosure, the new DL DCI format may be configured to include or not to include at least one field having a fixed field size among fields in the legacy DL DCI format.

In each aspect of the present disclosure, the aligning, by the BS, the size of the legacy UL DCI format and the size of the legacy DL DCI format with the second DCI size may include aligning the size of the legacy UL DCI format and the size of the legacy DL DCI format with the second DCI size, based on i) aligning the size of the new UL DCI format and the size of the new UL DCI format with the first DCI size, and ii) non-fulfillment of conditions. The determining, by the UE, the second DCI size based on the size of the legacy UL DCI format and the size of the legacy DL DCI format may include determining the second DCI size based on the size of the legacy UL DCI format and the size of the legacy DL DCI format, based on i) determination of the first DCI size based on the size of the new UL DCI format and the size of the new UL DCI format, and ii) non-fulfillment of conditions.

In each aspect of the present disclosure, the conditions may comprise conditions that: i) a total number of different DCI sizes configured to be monitored by the UE is not larger than X+1 for a cell, and ii) a total number of different DCI sizes configured to be monitored by the UE with a cell radio network temporary identifier (C-RNTI) is not larger than X for the cell.

In each aspect of the present disclosure, transmitting/receiving the at least one DCI may comprise transmitting/receiving DCI of the new UL DCI format or DCI of the new DL DCI format based on the first DCI size.

In each aspect of the present disclosure, the legacy UL DCI format may be DCI format 0_1, and the new UL DCI format may be a DCI format different from DCI format 0_0 and the DCI format 0_1. The legacy DL DCI format may be DCI format 1_1, and the new DL DCI format may be a DCI format different from DCI format 1_0 and the DCI format 1_1.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 5 illustrates a random access procedure applicable to implementation(s) of the present disclosure;

DETAILED DESCRIPTION

Figure 1:
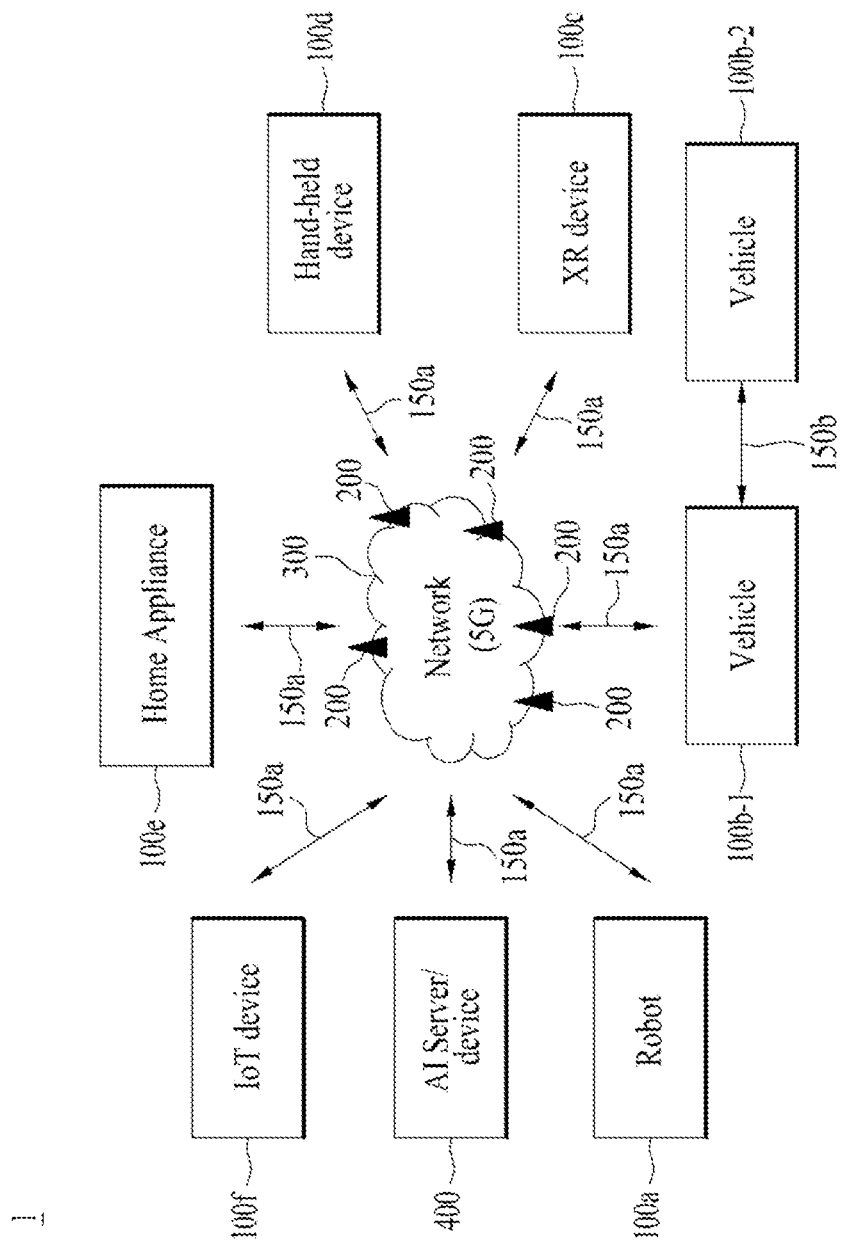
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/ UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
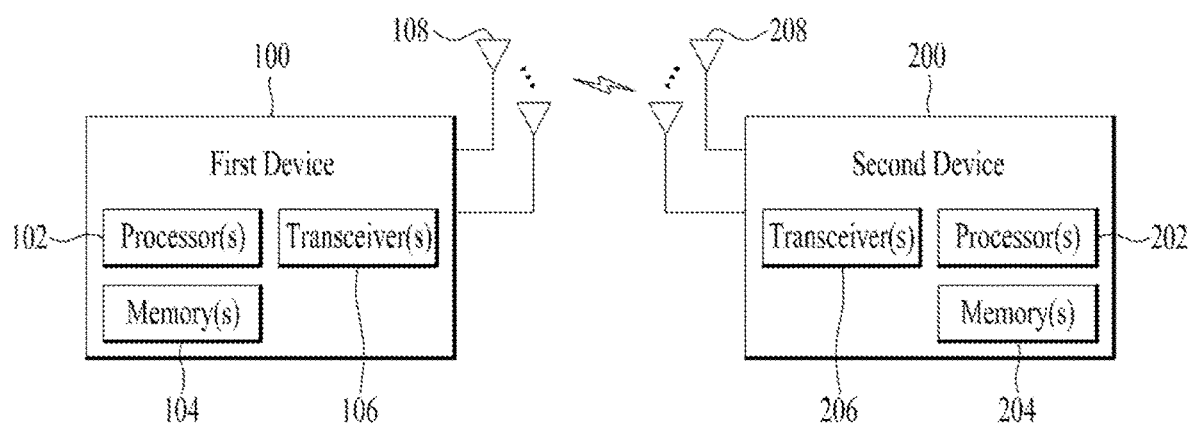
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the above-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the above-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the above-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the above-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
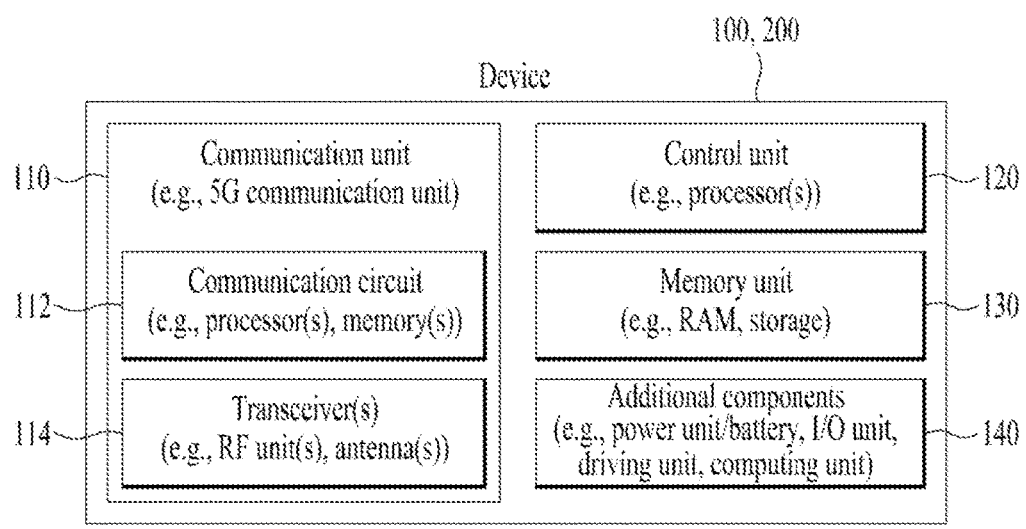
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/ device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
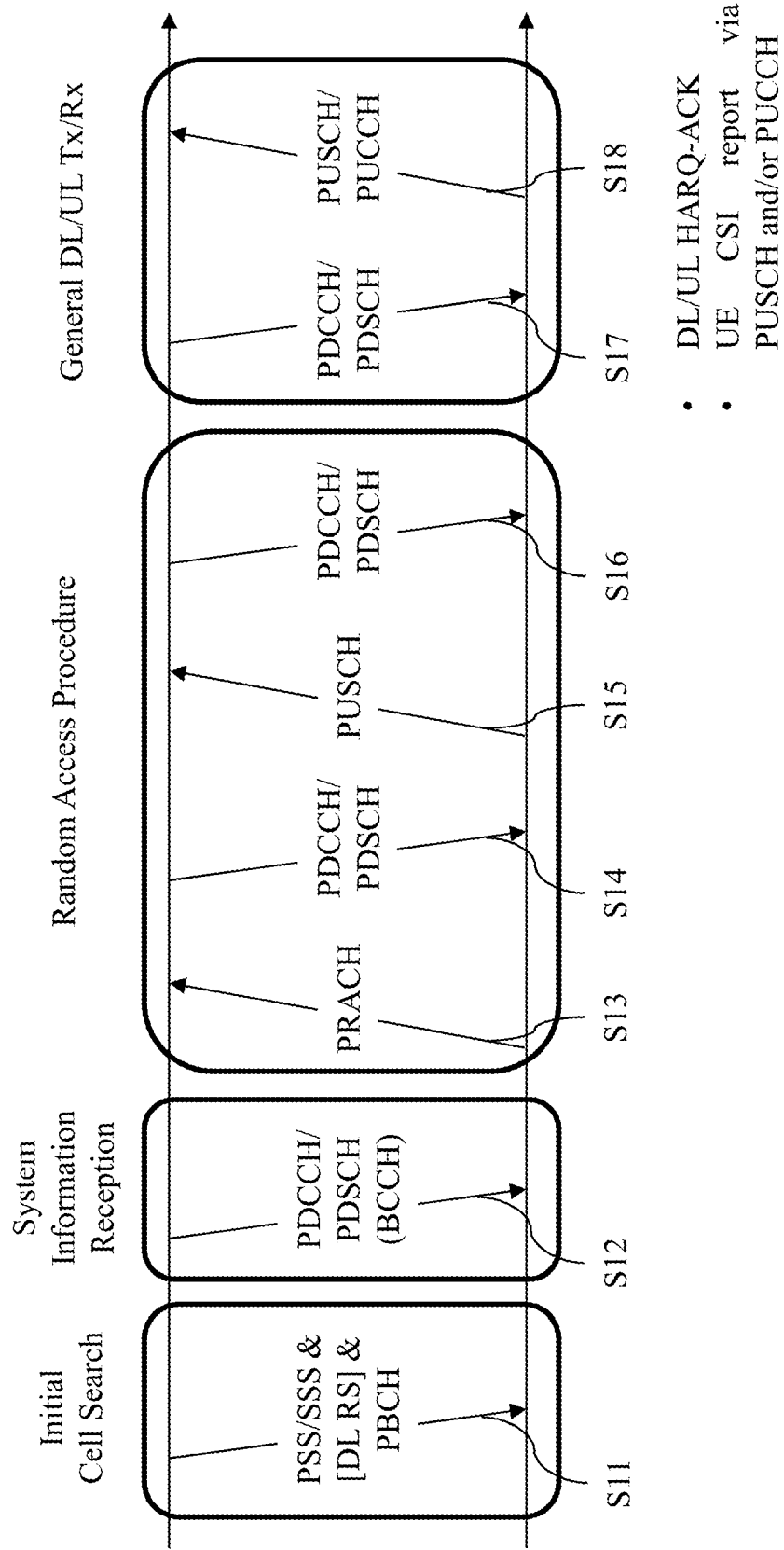
FIG. 4 illustrates physical channels used in a 3rd generation partnership project (3GPP)-based communication system, which is an example of a wireless communication system, and a signal transmission/reception process using physical channels.

FIG. 4 illustrates physical channels used in a 3GPP-based communication system, which is an example of a wireless communication system, and a signal transmission/reception process using physical channels.

A UE that is powered on again from a power-off state or a UE that has been disconnected from a wireless communication system performs an initial cell search procedure, such as search for a proper cell on which the UE is to camp and synchronization establishment with the cell or with a BS of the cell (S11). In the initial cell search procedure, the UE receives a synchronization signal block (SSB) (also called an SSB/PBCH block) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may also acquire broadcast information in a cell based on the PBCH. On the other hand, the UE may receive a downlink reference signal (DL RS) in the initial cell search procedure to check a DL channel state.

Upon completion of the initial cell search procedure, the UE may camp on the cell. After camping on the cell, the UE may monitor a PDCCH on the cell and receive downlink control information (DCI) carried by the PDCCH, thereby acquiring more specific system information (S12).

Next, the UE may perform a random access procedure to complete access to the BS (S13 to S16). For example, in the random access procedure, the UE may transmit a preamble on a physical random access channel (PRACH) (S13) and receive a random access response (RAR) to the preamble based on a PDCCH and a PDSCH corresponding to the PDCCH (S14). Upon failing to receive the RAR for the UE, the UE may re-attempt to transmit the preamble. In the case of contention-based random access, the UE may perform a contention resolution procedure including transmission of a PUSCH based on UL resource allocation included in the RAR (S15) and reception of a PDCCH and the PDSCH corresponding to the PDCCH (S16).

After the foregoing procedures, the UE may perform reception of the PDCCH/PDSCH (S17) and transmission of the PUSCH/PUCCH (S19) as a general UL/DL signal transmission process. Control information transmitted by the UE to the BS is collectively referred to as uplink control information (UCI). The UCI includes hybrid automatic repeat and request (HARD) acknowledgement/negative-acknowledgement (ACK/NACK) (also called HARQ-ACK), scheduling request (SR), channel state information (CSI), etc. The CSI may include a channel quality indicator (CQI), a precoding matrix indicator (PMI), and/or a rank indicator. Generally, the UCI is transmitted on the PUCCH. However, when control information and traffic data need to be simultaneously transmitted, the UCI may be transmitted on the PUSCH. The UE may aperiodically transmit the UCI on the PUSCH based on the request/indication of a network.

FIG. 5 illustrates a random access procedure applicable to implementation(s) of the present disclosure. Particularly FIG. 5(a) illustrates a 4-step random access procedure and FIG. 5(b) illustrates a 2-step random access procedure.

The random access procedure may be variously used for initial access, UL synchronization adjustment, resource allocation, handover, radio link reconfiguration after failure of a radio link, location measurement, and the like. The random access procedure is classified into a contention-based procedure and a dedicated (i.e., non-contention-based) procedure. The contention-based random access procedure is normally used including initial access and the dedicated random access procedure is used for the case in which handover is needed, DL data reaches the network, location measurement is performed, and/or UL synchronization is reconfigured.

A PRACH preamble configuration to be used may be provided to the UE. Multiple RACH preambles (i.e., PRACH preamble formats) are defined by one or more RACH OFDM symbols and different cyclic prefixes (CPs) (and/or guard times). A PRACH preamble configuration for a cell provides the UE with available PRACH preamble format on the cell and RACH occasion(s). The RACH occasion refers to a time-frequency resource available for transmission/reception of the random access (RA) preamble(s). In some scenarios, one RACH occasion (RO) is configured with respect to all possible RA preambles transmittable on the cell by an RRC message (e.g., SIB2 of the cell). In other scenarios, SSBs may be selected in association with different beams and association between the SSB and the RO may be provided to the UE by the BS. SSBs associated with different DL beams of the cell may be identified by different SSB indexes and the different SSB indexes may represent different DL beams. The BS provides an available set of ROs for RA preamble transmission, and RO(s) associated with the SSB, through a PRACH configuration including the PRACH preamble configuration. For example, the UE may be provided with the number of SSBs associated with one RO by a higher layer (e.g., RRC) parameter SSB-perRACH-Occasion. Each of the SSBs transmitted on a cell is associated with one or more ROs based on the PRACH configuration for the cell. The BS may provide the number of preambles per SSB to the UE through the PRACH configuration. For example, the number of preambles per SSB may be provided by the value of a higher layer parameter cb-preamblePerSSB. The UE may determine the total number of preambles per RO and per SSB based on the value of SSB-perRACH-Occasion and the value of cb-preamblePerSSB. SSB indexes may be mapped to ROs in the following order:

first, in ascending order of preamble indexes in a single RO;
second, in ascending order of frequency resource indexes for frequency-multiplexed ROs;
third, in ascending order of time resource indexes for time-multiplexed ROs in an RACH slot; and/or
fourth, in ascending order for RACH slots.

In some scenarios in which SSBs are associated with different DL beams, the UE may detect one or plural SSBs on a cell, select an SSB (randomly or based on reference signal received power (RSRP)) from among the detected SSBs, and determine an RO associated with the selected SSB through the PRACH configuration. The UE may transmit an RA preamble on the determined RO. The BS may monitor available ROs on a cell and may be aware of which SSB the UE that has transmitted the RA preamble has selected from among SSBs of different SSB indexes transmitted by the BS on the cell, based on an RO in which the RACH preamble has been received. The BS may determine an appropriate DL beam for the UE based on the SSB selected by the UE.

In the contention-based random access procedure, the UE selects an RA preamble. In the contention-based random access procedure, a plurality of UEs may simultaneously transmit the same RA preamble. Therefore, a contention resolution procedure is needed after the UEs simultaneously transmit the same RA preamble. In contrast, in the dedicated random access procedure, the UEs use RA preambles uniquely allocated thereto by the BS. Accordingly, a UE may perform the random access procedure without colliding with other UEs.

Referring to FIG. 5(a), the contention-based random access procedure includes the following 4 steps. Hereinafter, messages transmitted in Step 1 to Step 4 may be referred to as Msg1 to Msg4, respectively.

Step 1: The UE transmits an RA preamble on a PRACH.
Step 2: The UE receives an RAR on a PDSCH from the BS.
Step 3: The UE transmits UL data to the BS on a PUSCH based on the RAR. Here, the UL data includes a layer 2 and/or layer 3 message.
Step 4: The UE receives a contention resolution message on a PDSCH from the BS.

The UE may receive information regarding random access from the BS through system information. If random access is required, the UE transmits Msg1 (e.g., preamble) on the PRACH to the BS. The BS may distinguish between RA preambles through ROs, which are time/frequency resources on which the RA preambles are transmitted, and through random access preamble indexes (PIs). Upon receiving an RA preamble from the UE, the BS transmits an RAR message to the UE on a PDSCH. For reception of the RAR message, the UE monitors, within a preset time window (e.g., ra-ResponseWindow), an L1/L2 control channel (PDCCH) which is circular redundancy check (CRC)-masked with a random access radio network temporary identifier (RA-RNTI) including scheduling information for the RAR message. Upon receiving the scheduling information through the PDCCH CRC-masked with the RA-RNTI, the UE may receive the RAR message on a PDSCH indicated by the scheduling information. Then, the UE determines whether an RAR therefor is present in the RAR message. Determination as to whether the RAR for the UE is present may be confirmed by determining whether a random access preamble ID (RAPID) for the preamble transmitted by the UE is present. The index of the preamble transmitted by the UE and the RAPID may be the same. The RAR includes a corresponding random access preamble index, timing offset information for UL synchronization (e.g., timing advance command (TAC)), UL scheduling information for Msg3 transmission (e.g., UL grant), and UE temporary identification information (e.g., temporary cell RNTI (TC-RNTI)). Upon receiving the RAR, the UE transmits Msg3 on the PUSCH according to UL scheduling information and a timing offset value included in the RAR. Msg3 may include the ID of the UE (or global ID of the UE). Msg3 may also include RRC connection request related information (e.g., RRCSetupRequest message) for initial access to the network. After receiving Msg3, the BS transmits Msg4, which is a contention resolution message, to the UE. When the UE receives the contention resolution message and successfully performs contention resolution, the TC-RNTI is changed to a C-RNTI. Msg4 may include the ID of the UE and/or RRC connection related information (e.g., RRCSetup message). If information transmitted through Msg3 is not equal to information received through Msg4 or if the UE fails to receive Msg4 for a certain period of time, the UE may determine that contention resolution fails and retransmit Msg3. If the UE successfully performs contention resolution, the UE may transition to an RRC_CONNECTED state. When the UE is in RRC_CONNECTED, RRC messages may be exchanged between the RRC layer of the UE and the RRC layer of the BS. That is, the UE in RRC_CONNECTED may imply a UE that has established an RRC connection with the BS.

The dedicated random access procedure includes the following three steps. Hereinbelow, messages transmitted in Step 0 to Step 2 will be referred to as Msg0 to Msg2, respectively. The dedicated random access procedure may be triggered at the UE by the BS using a PDCCH used for commanding RA preamble transmission (hereinafter, PDCCH order).

Step 0: The BS allocates an RA preamble to the UE through dedicated signaling.
Step 1: The UE transmits the RA preamble on a PRACH.
Step 2: The UE receives an RAR on a PDSCH.

The operations of Step 1 to Step 2 of the dedicated random access procedure may be equal to the operations of Step 1 to Step 2 of the contention-based random access procedure.

The NR system may require latency lower than that of a legacy system. Particularly, the 4-step random access procedure may be undesirable with respect to services sensitive to latency such as URLLC. In various scenarios of the NR system, a random access procedure of low latency may be required. When implementation(s) of the present disclosure are performed together with the random access procedure, the implementation(s) of the present disclosure may perform the following 2-step random access procedure together in order to reduce latency in the random access procedure.

Referring to FIG. 5(b), the 2-step random access procedure may include MsgA transmission from the UE to the BS and MsgB transmission from the BS to the UE. MsgA transmission may include RA preamble transmission on a PRACH and UL payload transmission on a PUSCH. In transmitting MsgA, the PRACH and the PUSCH may be subjected to time division multiplexing (TDM) for transmission. Alternatively, in transmitting MsgA, the PRACH and the PUSCH may be subjected to frequency division multiplexing (FDM) for transmission.

Upon receiving MsgA, the BS may transmit MsgB to the UE. MsgB may include an RAR for the UE.

An RRC connection request related message (e.g., RRCSetupRequest message) for making a request for connection establishment between the RRC layer of the BS and the RRC layer of the UE may be transmitted in the payload of MsgA. In this case, MsgB may be used for transmission of an RRC connection related information (e.g., RRCSetup message). Unlike this, the RRC connection request related message (e.g., RRCSetupRequest message) may be transmitted on a PUSCH transmitted based on a UL grant in MsgB. In this case, the RRC connection related information (e.g., RRCSetup message) related to the RRC connection request may be transmitted on a PDSCH associated with PUSCH transmission after PUSCH transmission based on MsgB is performed.

Upon successfully receiving MsgB associated with MsgA transmitted by the UE, the UE may transition to an RRC_CONNECTED state. When the UE is in RRC_CONNECTED, RRC messages may be exchanged between the RRC layer of the UE and the RRC layer of the BS. That is, the UE in RRC_CONNECTED may imply a UE that has established an RRC connection with the BS.

Figure 6:
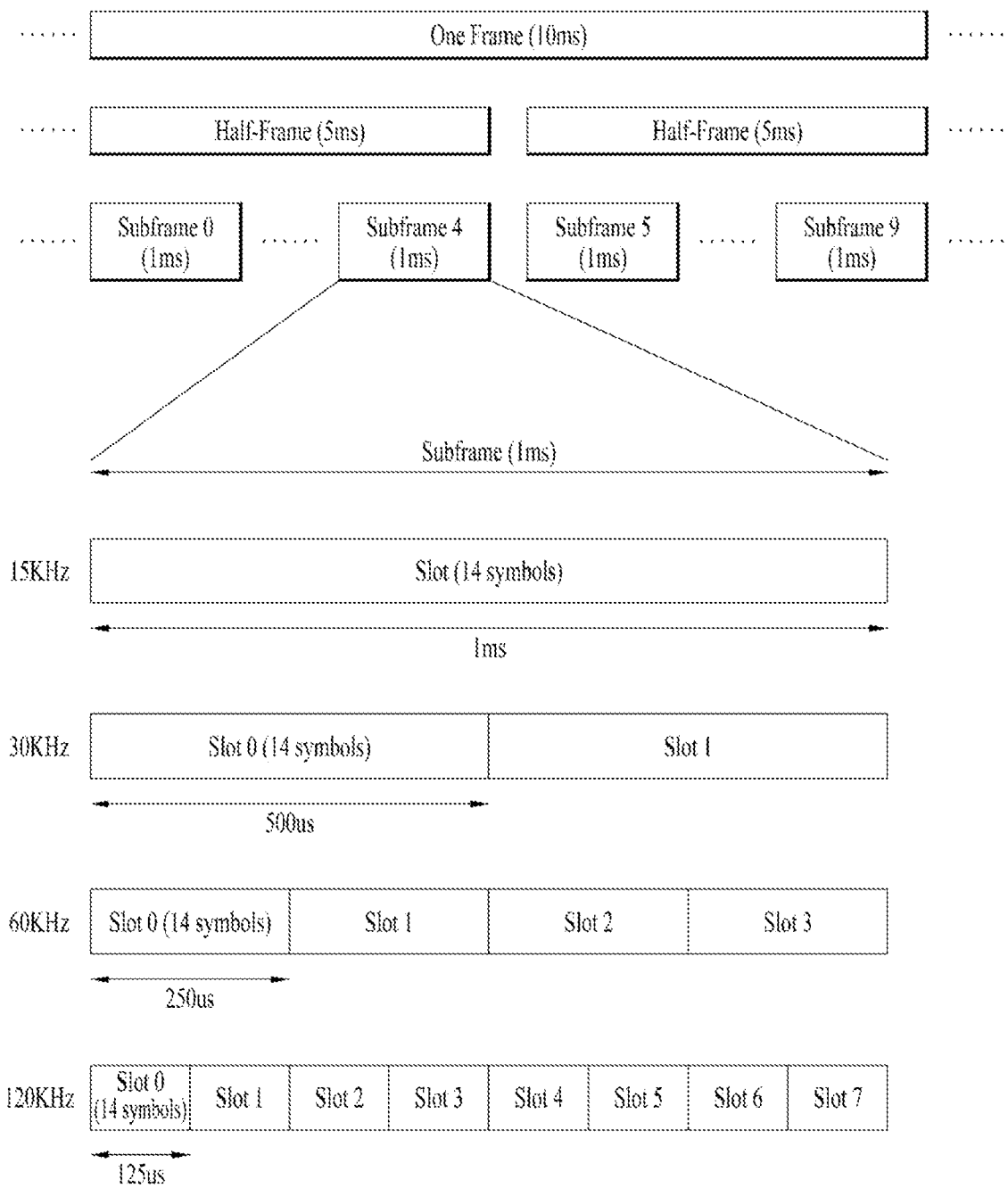
FIG. 6 illustrates an example of a frame structure used in a 3rd generation partnership project (3GPP)-based wireless communication system.

FIG. 6 illustrates an example of a frame structure used in a 3GPP-based wireless communication system.

The frame structure of FIG. 6 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 6, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa=T_s/T_f=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

Figure 7:
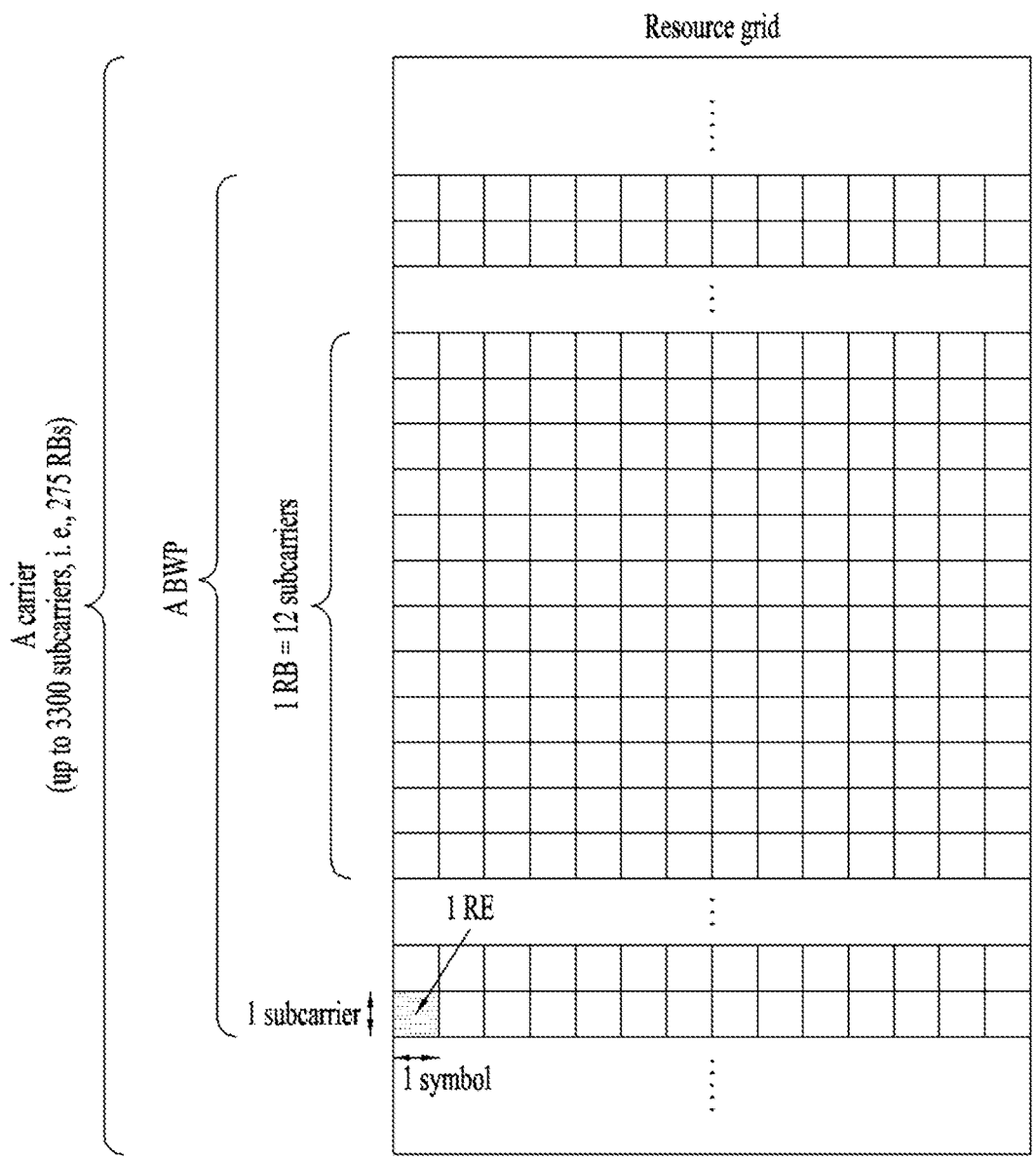
FIG. 7 illustrates a resource grid of a slot.

FIG. 7 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i}-1$, where i is a number of the BWP. The relation between a PRB $n_{PRB}$ in a BWP i and a CRB $n_{CRB}$ is given by: $n_{PRB}=n_{CRB}+N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

Figure 8:
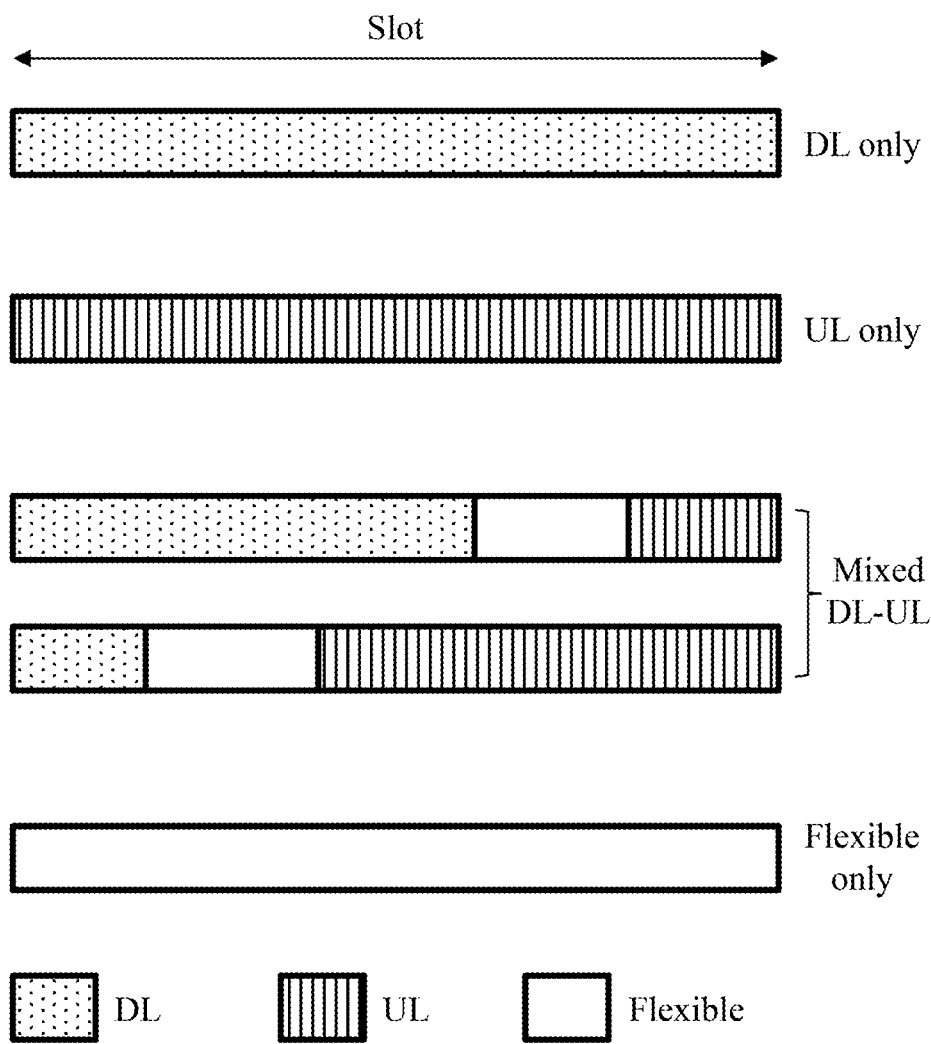
FIG. 8 illustrates slot structures used in a 3GPP-based system.

FIG. 8 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;
nrofDownlinkSlots that provides the number of consecutive full DL slots at the beginning of each DL-UL pattern, where the full slots are slots having only DL symbols;
nrofDownlinkSymbols that provides the number of consecutive DL symbols at the beginning of a slot immediately following the last full DL slot;
nrofUplinkSlots that provides the number of consecutive full UL slots at the end of each DL-UL pattern, where the full UL slots are slots having only UL symbols; and
nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | ... | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an RNTI used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or UL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides the UE with parameters (e.g., CORESET #0) for monitoring a PDCCH for scheduling a PDSCH carrying system information block 1 (SIB1). The PBCH may indicate that there is no associated SIB1. In this case, the UE is informed of not only a frequency range within which it may be assumed that there is no SSB associated with SSB1 but also another frequency range within which the SSB associated with SIB1 is to be discovered. CORESET #0, which is a CORESET for scheduling at least SIB1, may be configured through either the MIB or dedicated RRC signaling.

The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

controlResourceSetId: Indicator for identifying a CORESET associated with the search space set;

monitoringSlotPeriodicityAndOffset: A PDCCH monitoring periodicity and a PDCCH monitoring offset, for configuring slots for PDCCH monitoring.

duration: The number of consecutive slots that the search space lasts in every occasion, i.e., upon every period as given in monitoringSlotPeriodicityAndOffset.

monitoringSymbolsWithinSlot: A PDCCH monitoring pattern in a slot, indicating the first symbol(s) of the CORESET in a slot for PDCCH monitoring.

nrofCandidates: The number of PDCCH candidates per CCE aggregation level.

The UE monitors PDCCH candidates only in PDCCH monitoring occasions. The UE determines the PDCCH monitoring occasions from a PDCCH monitoring periodicity, a PDCCH monitoring offset, and a PDCCH monitoring pattern in a slot. Parameter monitoringSymbolsWithinSlot indicates, for example, the first symbol(s) for PDCCH monitoring in slots configured for PDCCH monitoring (e.g., refer to parameters monitoringSlotPeriodicityAndOffset and duration). For example, if monitoringSymbolsWithinSlot is 14 bits, the bits of monitoringSymbolsWithinSlot may represent 14 OFDM symbols of a slot, respectively, such that the most significant (left) bit represents the first OFDM symbol in the slot and the second most significant (left) bit represents the second OFDM symbol in the slot. For example, bit(s) set to 1 among the bits in monitoringSymbolsWithinSlot identify the first symbol(s) of the CORESET in the slot.

The following table shows search space sets, related RNTIs, and use cases.

TABLE 5

| Search Space Set | RNTI | Use Case |
|---|---|---|
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI MCS-C-RNTI, or CS-RNTI(s) | |
| USS set | C-RNTI, or MCS-C-RNTI, or CS-RNTI(s) | User specific PDSCH decoding |

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 6, (0) PUCCH Format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)
Supported UCI payload size: more than K bits (e.g., K=2)
Number of OFDM symbols constituting a single PUCCH:
1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
Configuration for PUCCH format 2 includes the following parameters for a corresponding PUCCH resource: the number of PRBs, the number of symbols for PUCCH transmission, and/or the first symbol for PUCCH transmission.
(3) PUCCH Format 3 (PF3 or F3)
Supported UCI payload size: more than K bits (e.g., K=2)
Number of OFDM symbols constituting a single PUCCH:
Y to Z symbols (e.g., Y=4 and Z=14)
Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
Configuration for PUCCH format 3 includes the following parameters for a corresponding PUCCH resource: the number of PRBs, the number of symbols for PUCCH transmission, and/or the first symbol for PUCCH transmission.
(4) PUCCH Format 4 (PF4 or F4)
Supported UCI payload size: more than K bits (e.g., K=2)
Number of OFDM symbols constituting a single PUCCH:
Y to Z symbols (e.g., Y=4 and Z=14)
Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
Configuration for PUCCH format 4 includes the following parameters for a corresponding PUCCH resource: the number of symbols for PUCCH transmission, length for the OCC, an index for the OCC, and the first symbol for PUCCH transmission.
The table below shows the PUCCH formats. The PUCCH formats may be divided into short PUCCH formats (formats 0 and 2) and long PUCCH formats (formats 1, 3, and 4) according to PUCCH transmission length.

TABLE 6

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |

TABLE 6-continued

| PUCCH format | Length in OFDM symbols $N^{PUCCH}_{symb}$ | Number of bits | Usage | Etc. |
|---|---|---|---|---|
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.—PUCCH resource set #0, if the number of UCI bits=<2

PUCCH resource set #1, if 2<the number of UCI bits=<$N_1$

. . .

PUCCH resource set #(K−1), if $N_{K−2}$<the number of UCI bits=<$N_{K−1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE.

The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the B S may dynamically allocate UL resources to the UE through PDCCH(s) addressed to a cell radio network temporary identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the B S may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 9:
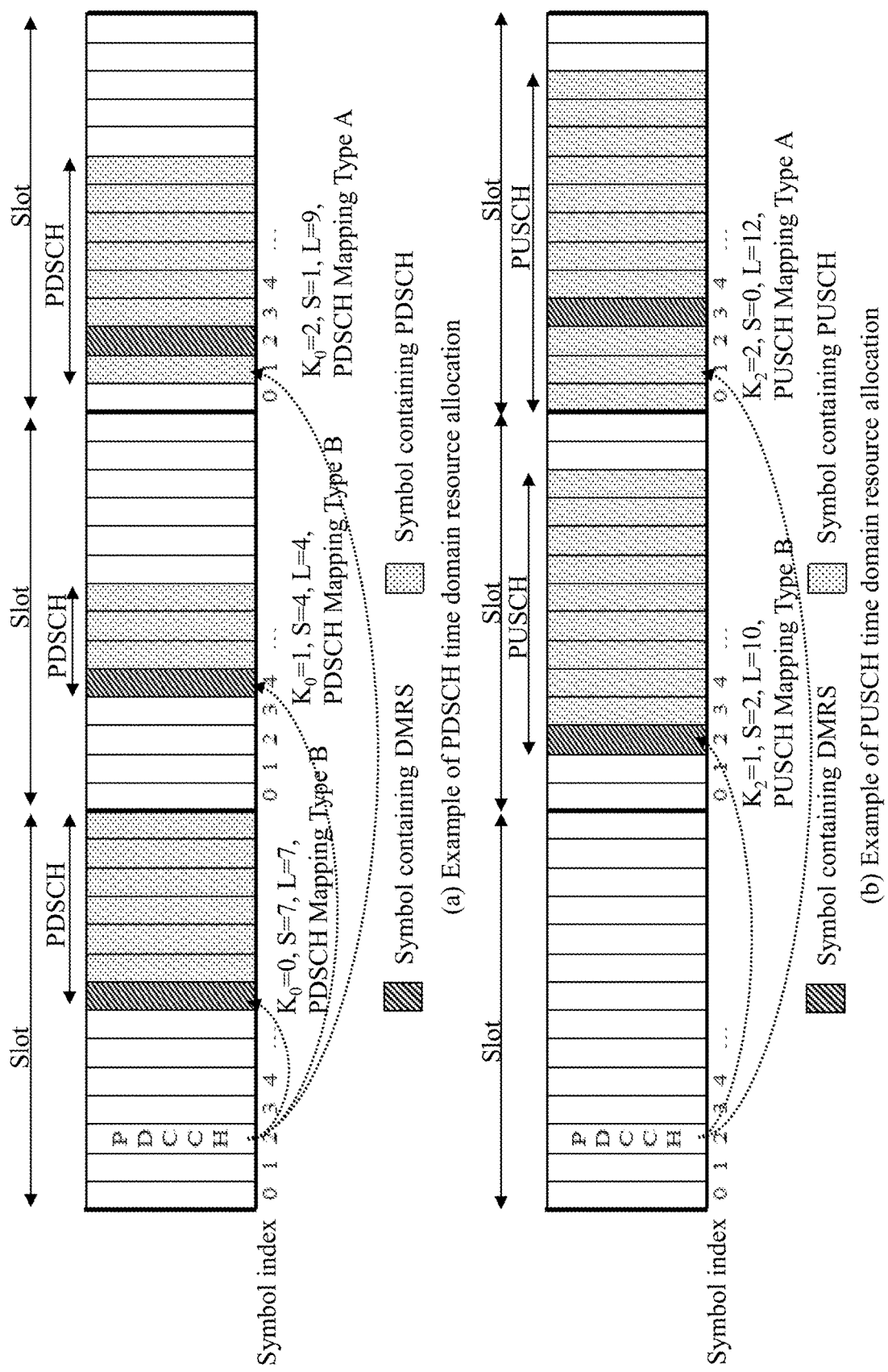
FIG. 9 illustrates an example of PDSCH time domain resource assignment (TDRA) caused by a PDCCH and an example of PUSCH TDRA caused by the PDCCH.

FIG. 9 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPerSlot)+ (slot number in the frame*numberOfSymbolsPerSlot)+symbol number in the slot]=[(SFN$_{start\ time}$* numberOfSlotsPerFrame*numberOfSymbolsPerSlot+ slot$_{start\ time}$*numberOfSymbolsPerSlot+symbol$_{start\ time}$)+ N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:
  cs-RNTI corresponding to a CS-RNTI for activation, deactivation, and retransmission;
  nrofHARQ-Processes that provides the number of HARQ processes for SPS;
  periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+ slot$_{start\ time}$)+N*periodicity*numberOfSlotsPerFrame/10]modulo(1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 7

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 8

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 10:
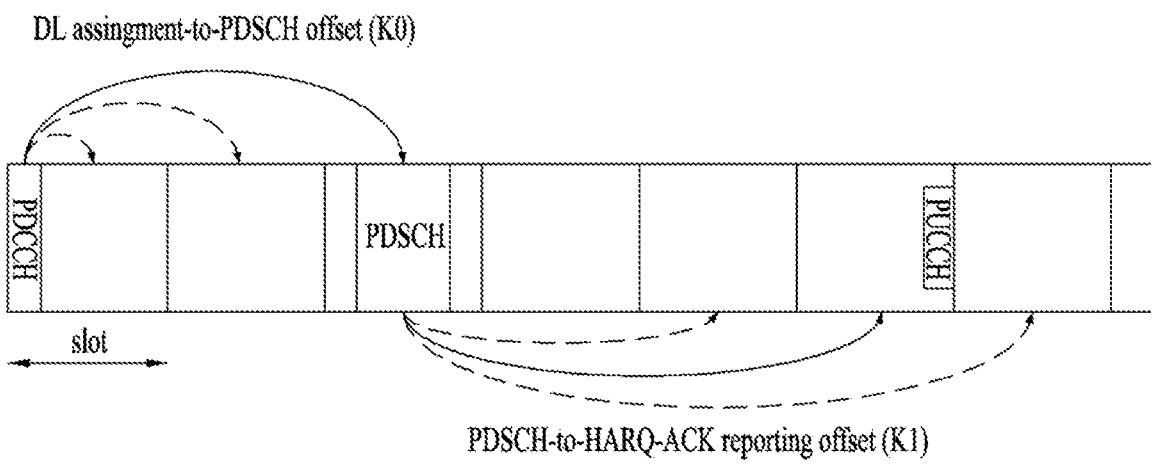
FIG. 10 illustrates a hybrid automatic repeat request-acknowledgement (HARQ-ACK) transmission/reception procedure.

FIG. 10 illustrates a HARQ-ACK transmission/reception procedure.

Referring to FIG. 10, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}.

When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n−k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be permitted to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 11:
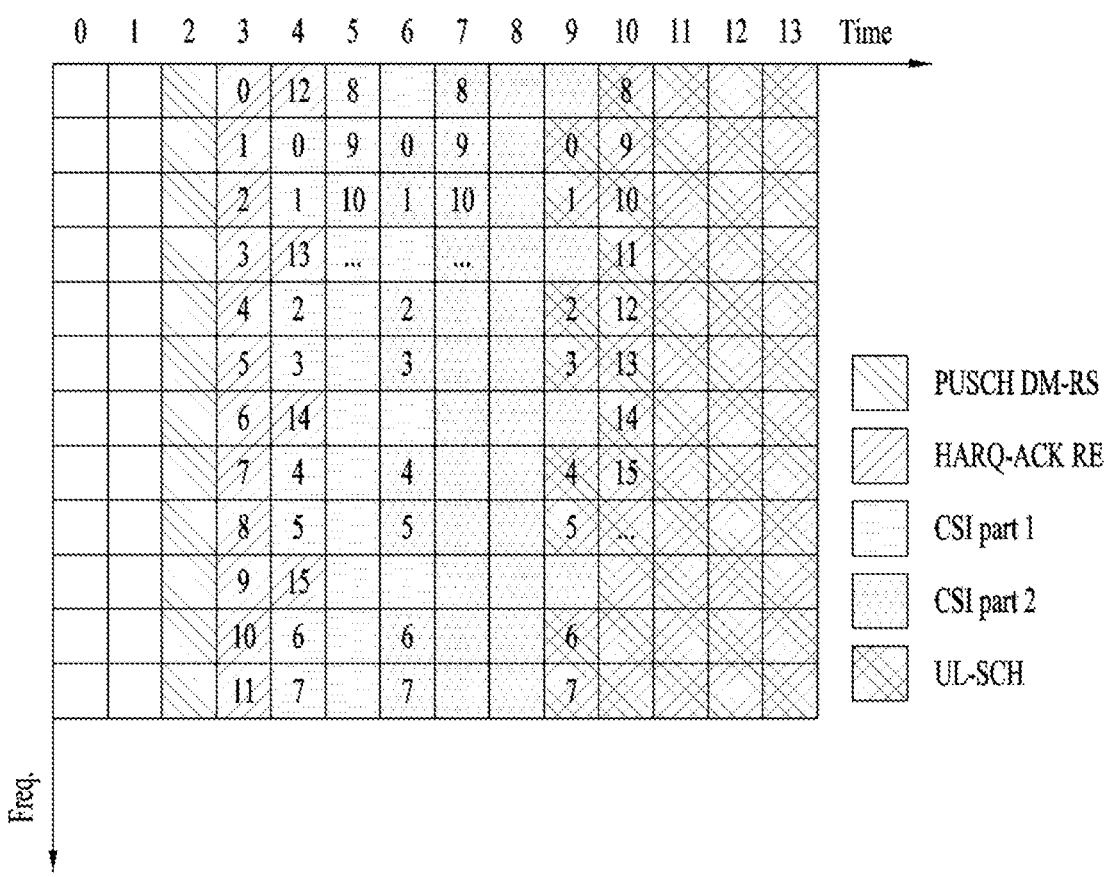
FIG. 11 illustrates an example of multiplexing uplink control information (UCI) with a physical uplink shared channel (PUSCH)

FIG. 11 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 11 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 12:
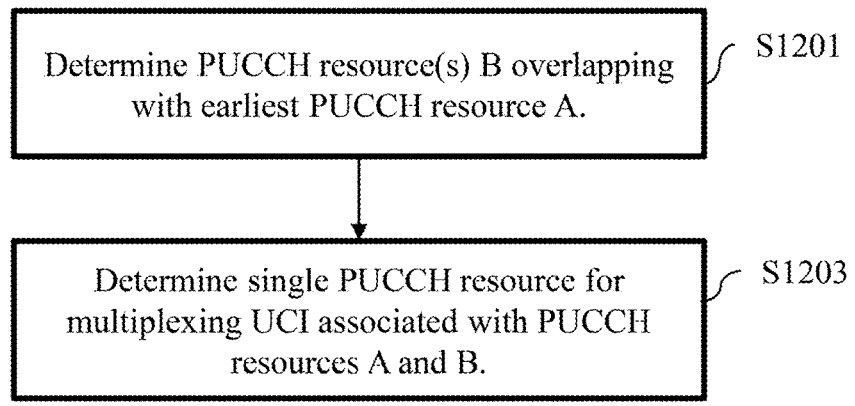
FIG. 12 illustrates an example of a process for a UE with overlapping PUCCHs in a single slot to handle collision between UL channels.

FIG. 12 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1201). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1203). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 13:
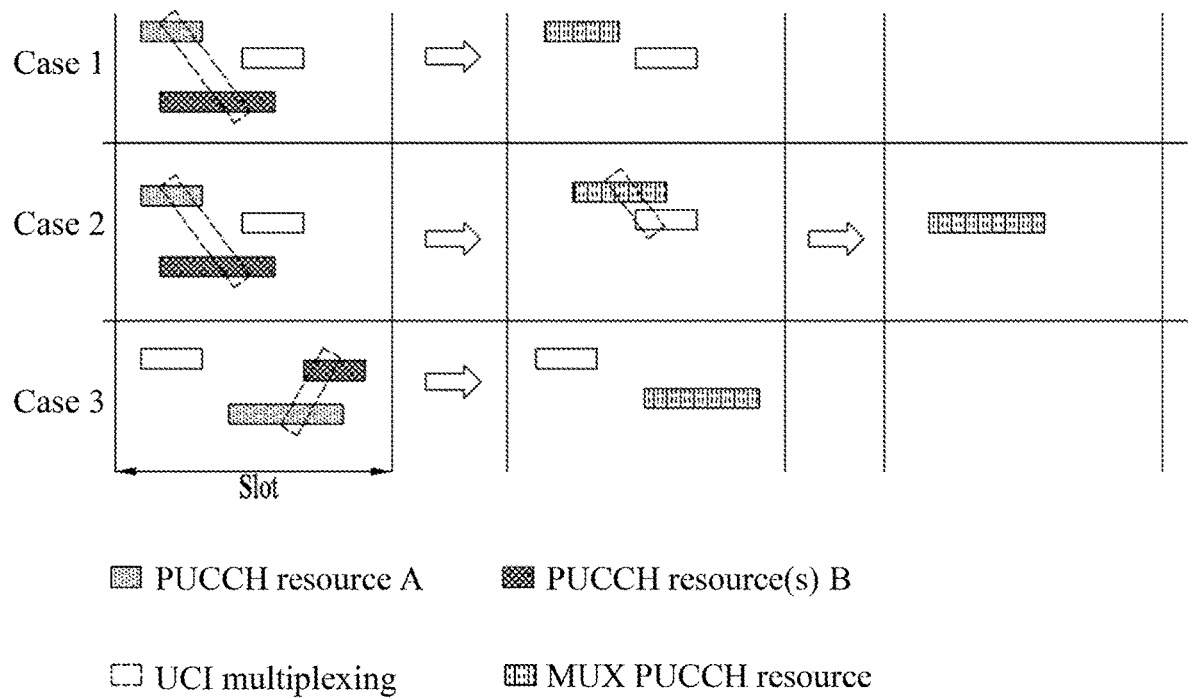
FIG. 13 illustrates cases for performing UCI multiplexing based on FIG. 12.

FIG. 13 illustrates cases for performing UCI multiplexing based on FIG. 12. Referring to FIG. 13, when a plurality of PUCCH resources overlap in a slot, UCI multiplexing may be performed based on the earliest PUCCH resource A (e.g., PUCCH resource A with the earliest start symbol). In FIG. 13, Case 1 and Case 2 show that the first PUCCH resource overlaps with another PUCCH resource. In this case, the process of FIG. 12 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 12 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 12 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 14:
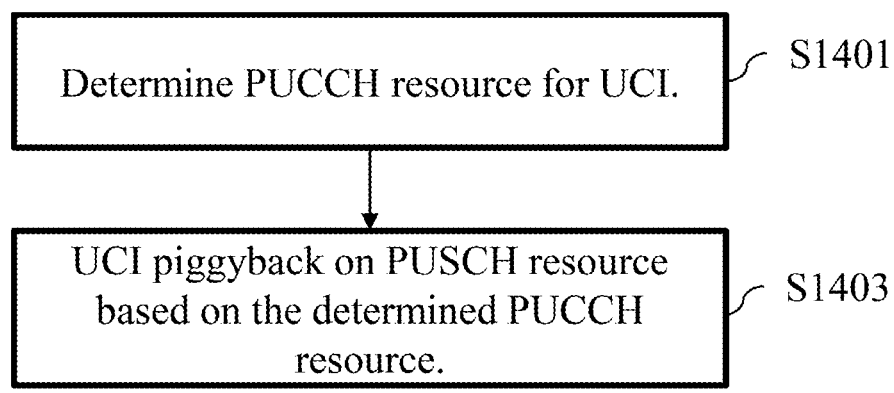
FIG. 14 illustrates a process for a UE with an overlapping PUCCH and PUSCH in a single slot to handle collision between UL channels.

FIG. 14 illustrates a process for a UE with an overlapping PUCCH and PUSCH in a single slot to handle collision between UL channels.

To transmit UCI, the UE may determine a PUCCH resource (S1401). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1403). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1503 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 15:
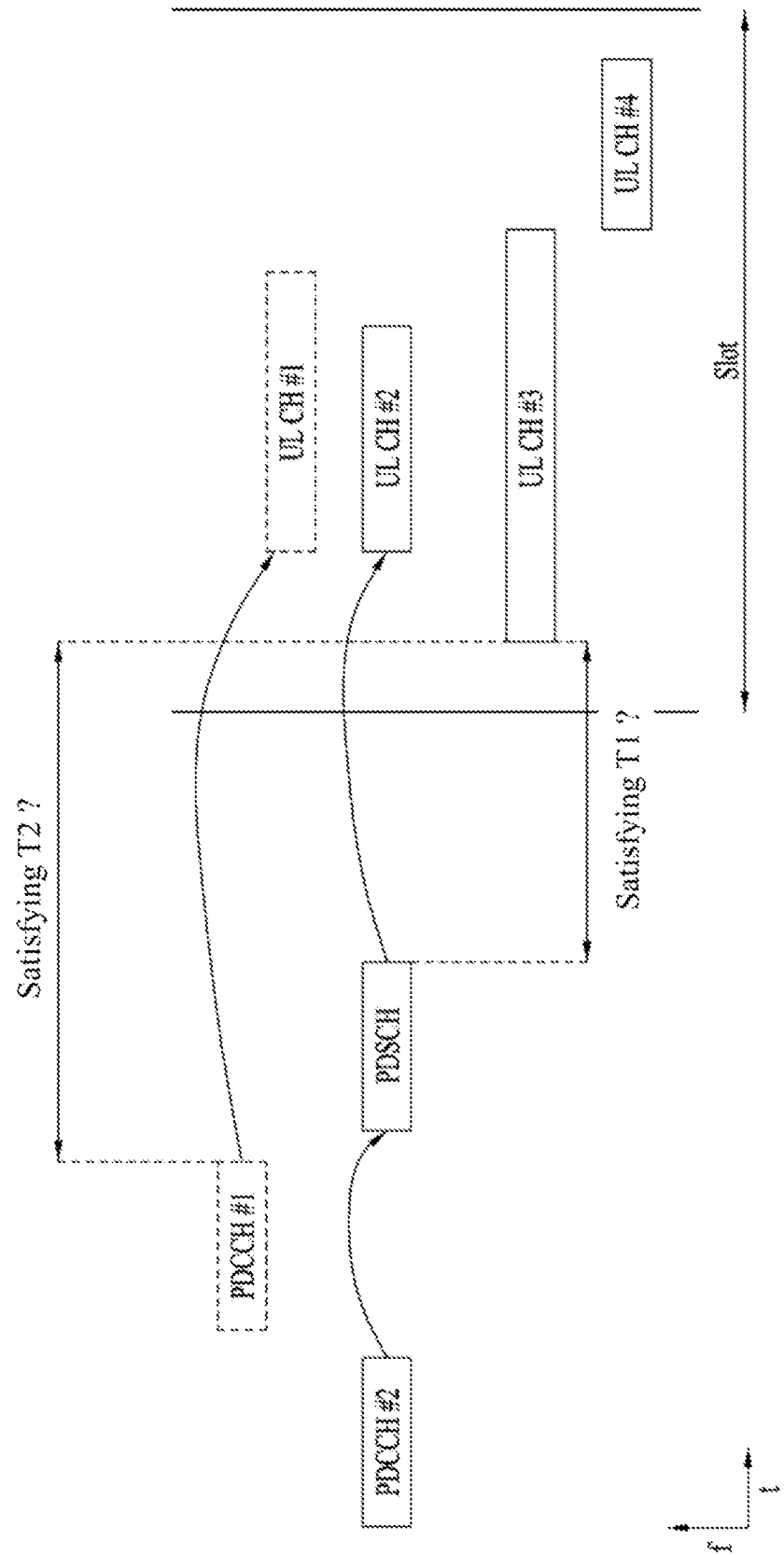
FIG. 15 illustrates UCI multiplexing considering a timeline condition.

FIG. 15 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time N1+ from the start symbol of the earliest channel among the overlapping PUCCH(s) and/or PUSCH(s) (on the time axis). T1 may be determined based on i) a minimum PDSCH processing time N1 defined according to a UE processing capability, and/or ii) d1 predefined as an integer equal to or greater than 0 according to a scheduled symbol position, a DMRS position in the PUSCH, BWP switching, etc.

For example, T1 may be determined as follows: $T1=(N1+d1)*(2048+144)*\kappa*2^{-\mu}*T_c$. N1 is based on $\mu$ of Table 9 and Table 10 for UE processing capabilities #1 and #2, respectively, and $\mu$ is one of $(\mu_{PDCCH}, \mu_{PDSCH}, \mu_{UL})$, that causes the largest T1, where $\mu_{PDCCH}$ corresponds to a subcarrier spacing of a PDCCH for scheduling the PDSCH, $\mu_{PDSCH}$ corresponds to a subcarrier spacing of the scheduled PDSCH, $\mu_{UL}$ corresponds to a subcarrier spacing of a UL channel on which HARQ-ACK is to be transmitted, and $\kappa=T_c/T_f=64$. In Table 9, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for a PDSCH mapping type A is present on an i-th slot, $d1=7_{-i}$ for i<7 and, otherwise, d1=0. If the PDSCH has a mapping type B for UE processing capability #1, d1 may be 0 when the number of allocated PDSCH symbols is 7, d1 may be 3 when the number of allocated PDSCH symbols is 4, d1 may be 0 when the number of allocated PDSCH symbols is 7, d1 may be 3 when the number of allocated PDSCH symbols is 4, and d1 may be 3+d when the number of allocated PDSCH symbols is 2, where d is the number of overlapping symbols of the scheduling PDCCH and the scheduled PDSCH. If the PDSCH mapping type is B for UE processing capability #2, d1 may be 0 when the number of allocated PDSCH symbols is 7, and d1 may correspond to the number of overlapping symbols of the scheduling PDCCH and the scheduled PDSCH when the number of allocated PDSCH symbols is 4. Further, if the number of allocated PDSCH symbols is 2, d1 may be 3 when the scheduling PDSCH is within a 3-symbol CORESET and the CORESET and the PDSCH have the same start symbol, and d1 may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) d2 predefined as an integer equal to or greater than 0 according to the scheduled symbol position, BWP switching, etc. d2 may be categorized into $d_{2,1}$ related to the scheduled symbol position and $d_{2,2}$ related to BWP switching.

For example, T2 may be determined as follows: $T2=\max\{(N2+d_{2,1})*(2048+144)*\kappa*2^{-\mu}*T_c, d_{2,2}\}$. N2 is based on u of Table 11 and Table 12 for UE timing capabilities #1 and #2, respectively, and $\mu$ is one of $(\mu_{DL}, \mu_{UL})$, that causes the largest T1, where $\mu_{DL}$ corresponds to a subcarrier spacing of a PDCCH carrying DCI for scheduling a PUSCH, $\mu_{UL}$ corresponds to a subcarrier spacing of the PUSCH, and $\kappa=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 9 shows a PDSCH processing time for PDSCH processing capability #1 of the UE, Table 10 shows a PDSCH processing time for PDSCH processing capability #2 of the UE, Table 11 shows a PUSCH preparation time for PDSCH processing capability #1 of the UE, and Table 12 shows a PUSCH processing time for PDSCH processing capability #2 of the UE.

TABLE 9

| | PDSCH decoding time N1 [symbols] | |
|---|---|---|
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 10

| u/SCS | PDSCH decoding time N1 [symbols] |
|---|---|
| 0/15 kHz | 3 |
| 1/30 kHz | 4.5 |
| 2/60 kHz | 9 for frequency range 1 |

TABLE 11

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

TABLE 12

| u/SCS | PUSCH preparation time N2 [symbols] |
|---|---|
| 0/15 kHz | 5 |
| 1/30 kHz | 5.5 |
| 2/60 kHz | 11 for frequency range 1 |

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 12 to 14 may be UL channels that satisfy the multiplexing timeline condition(s). Referring to FIG. 15, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 16:
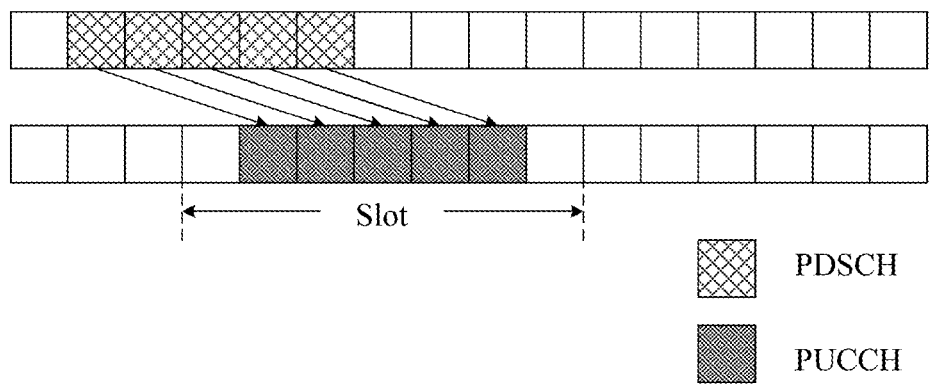
FIG. 16 illustrates transmission of a plurality of HARQ-ACK PUCCHs in a slot.

FIG. 16 illustrates transmission of a plurality of HARQ-ACK PUCCHs in a slot.

The current NR standard specification (e.g., 3GPP TS 38.213 V15.2.0) specifies that the UE is not expected to transmit a PUCCH with HARQ-ACK information in more than one slot. Accordingly, according to the current NR standard specification, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed with one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Accordingly, in order to flexibly and efficiently use resources and to support services, it is better to transmit a plurality of (non-overlapping) HARQ-ACK PUCCHs (or PUSCHs) in one slot as illustrated in FIG. 16.

In transmitting/receiving packets such as URLLC, a DCI field with a configurable size may be configured as a considered method to reduce DL signaling overhead among methods supporting a communication service with high reliability within a short time. In other words, scheduling for supporting URLLC may be easily performed or DL signaling overhead may be reduced, by differently configuring DCI field(s) under the necessity of the BS. For example, in order to improve PDCCH reception reliability in the UE, the BS may eliminate a specific field among the DCI fields that may be included in the DCI or reduce the size of the specific field, thereby reducing the total payload size of the DCI. Hereinbelow, examples of the present disclosure applicable to scenarios using the DCI field(s) that may be included in the DCI or using DCI formats having configurable size(s) will be described.

<DCI Size Alignment>

The table below list DCI formats that may be carried by a PDCCH.

TABLE 13

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 0_0 and DCI format 1_0 have fixed sizes after a BWP size is initially given by RRC. DCI format 0_1 and DCI format 1_1 may vary in the size of the DCI field through various RRC reconfigurations by the BS. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to deliver dynamic slot format information (e.g., a dynamic slot format indicator (SFI)) to the UE, and DCI format 2_1 may be used to deliver DL preemption information to the UE.

For example, each of DCI format 0_0 and DCI format 0_1 includes an FDRA field for scheduling a PUSCH, and each of DCI format 1_0 and DCI format 1_1 includes an FDRA field for scheduling a PDSCH. The number of bits in the FDRA field of each of DCI format 0_0 and DCI format 0_1 is determined based on $N_{RB}^{UL,BWP}$, which is the size of an active or initial UL BWP. The number of bits in the FDRA field of each of DCI format 1_0 and DCI format 1_1 is determined based on $N_{RB}^{DL,BWP}$, which is the size of an active or initial UL BWP.

Fields defined in the DCI formats are mapped to information bits $a_0$ to $a_{A-1}$ as follows. The first field of the DCI format is mapped to the lowest order information bit $a_0$, and each successive field is mapped to higher-order information bits. The most significant bit (MSB) of each field is mapped to the lowest order information bit for that field. For example, the MSB of the first field is mapped to $a_0$. If the number of information bits in a DCI format is less than 12 bits, zeros are appended to the DCI format until a payload size equals 12. The size of each DCI format is adjusted by DCI size alignment described below if necessary If necessary, DCI size alignment is performed in order to reduce complexity of blind decoding by the UE. For example, padding or truncation is applied to the DCI formats according to the following steps executed in the order below when necessary:

Step 0:
Determine DCI format 0_0 monitored in a CSS where $N_{RB}^{UL,BWP}$ is the size of the initial UL BWP.
Determine DCI format 1_0 monitored in a CSS where $N_{RB}^{DL,BWP}$ is given by
the size of CORESET #0 if CORESET #0 is configured for a corresponding cell; and
the size of the initial DL BWP if CORESET #0 is not configured for the cell.
If DCI format 0_0 is monitored in CSS and if the number of information bits in DCI format 0_0 prior to padding is less than the payload size of DCI format 1_0 monitored in CSS for scheduling the same serving cell, a number of zero padding bits is generated for DCI format 0_0 until the payload size equals that of DCI format 1_0.
If DCI format 0_0 is monitored in CSS and if the number of information bits in DCI format 0_0 prior to truncation is larger than the payload size of DCI format 1_0 monitored in CSS for scheduling the same serving cell, the bitwidth of the FDRA field in DCI format 0_0 is reduced by truncating the first few MSBs such that the size of DCI format 0_0 equals the size of DCI format 1_0.

Step 1:
Determine DCI format 0_0 monitored in a USS where $N_{RB}^{UL,BWP}$ is the size of the active UL BWP.
Determine DCI format 1_0 monitored in a USS where $N_{RB}^{DL,BWP}$ is the size of the active DL BWP.
If DCI format 0_0 is monitored in USS and if the number of information bits in DCI format 0_0 prior to padding is less than the payload size of DCI format 1_0 monitored in USS for scheduling the same serving cell, zeros are appended to DCI format 0_0 until the payload size equals that of DCI format 1_0.
If DCI format 1_0 is monitored in USS and if the number of information bits in DCI format 1_0 prior to padding is less than the payload size of DCI format 0_0 monitored in USS for scheduling the same serving cell, zeros are appended to DCI format 1_0 until the payload size equals that of DCI format 0_0

Step 2:
If the size of DCI format 0_1 monitored in a USS equals that of DCI format 0_0/1_0 monitored in another USS, one bit of zero padding is appended to DCI format 0_1.
If the size of DCI format 1_1 monitored in a USS equals that of DCI format 0_0/1_0 monitored in another USS, one bit of zero padding is appended to DCI format 1_1.

Step 3:
If both of the following conditions are fulfilled, the DCI size alignment procedure is completed:
the total number of different DCI sizes is no more than 4 for the cell; and
the total number of different DCI sizes with a C-RNTI configured to be monitored is no more than 3 for the cell.

Step 4:
Otherwise
Remove the padding bit (if any) introduced in Step 2 above.
Determine DCI format 1_0 monitored in a USS where $N_{RB}^{DL,BWP}$ is given by:
the size of CORESET #0 if CORESET #0 is configured for the cell; and
the size of the initial DL BWP if CORESET #0 is not configured for the cell.
Determine DCI format 0_0 monitored in a USS where $N_{RB}^{UL,BWP}$ is the size of the initial UL BWP.
If the number of information bits in DCI format 0_0 monitored in a USS prior to padding is less than the payload size of DCI format 1_0 monitored in USS for scheduling the same serving cell, a number of zero padding bits is generated for DCI format 0_0 monitored in a USS until the payload size equals that of DCI format 1_0 monitored in a USS.
If the number of information bits in DCI format 0_0 monitored in a USS prior to truncation is larger than the payload size of DCI format 1_0 monitored in a USS for scheduling the same serving cell, the bitwidth of the FDRA field in DCI format 0_0 is reduced by truncating the first few MSBs such that the size of DCI format 0_0 monitored in a USS equals that of DCI format 1_0 monitored in the USS.

Hereinafter, for convenience of description, the DCI size alignment procedure will be referred to as the "first DCI size alignment procedure".

The UE may be not expected to handle a configuration that, after applying the above steps, results in:
the total number of different DCI sizes configured to be monitored is more than 4 for the cell;
the total number of different DCI sizes with C-RNTI configured to be monitored is more than 3 for the cell;
the size of DCI format 0_0 in the USS is equal to DCI format 0_1 in another USS; or
the size of DCI format 1_0 in the USS is equal to DCI format 1_1 in another USS.

The UE and the BS may perform the DCI size alignment procedure. The BS may configure parameters affecting DCI size and the UE may determine DCI size(s) that the UE is to monitor in a corresponding cell based on the parameters. The parameters that affect the DCI size may include, for example, FDRA, TDRA, a PDSCH-to-HARQ feedback timing indicator, an antenna port, a BWP indicator, and/or an SRS resource indicator. The UE and the BS may determine whether to perform the DCI size alignment procedure for the cell based on the parameters. The BS may transmit DCI(s) on the corresponding cell based on DCI size(s) adjusted according to the DCI size alignment procedure. The UE expects that DCI(s) with the DCI size(s) adjusted according to the DCI size alignment procedure for the cell will be transmitted on the cell and performs DCI monitoring (i.e., PDCCH monitoring). In other words, the UE may perform DCI monitoring based on the DCI size(s) adjusted according to the DCI size alignment procedure for the cell.

In some scenarios, the UE is not expected to be configured to monitor a larger number of different DCI sizes than 4 for a specific cell. In other scenarios, the UE is not expected to be configured to monitor a larger number of different DCI sizes (CRC-scrambled with a C-RNTI) than 3 for a specific cell.

A control channel corresponding to a specific target service, quality of service (QoS), block error rate (BLER) requirement, reliability requirement, latency requirement, and/or processing time, (or control channel for scheduling a data channel corresponding thereto), include DCI. In order to support the specific target service, QoS, BLER requirement, reliability requirement, latency requirement, and/or processing time, a situation in which the sizes of DCI fields are configured to have additional DCI sizes different from an existing DCI size may occur. In this case, it may be not desirable (possible) to additionally define monitoring capability of the UE for the additional DCI sizes in addition to monitoring capability for the existing DCI size. When an additional DCI size is needed, it may be necessary to perform DCI size alignment/adjustment even without changing monitoring related capability of the UE for different DCI sizes. In some scenarios in which DCI field(s) included in the control channel corresponding to the specific target service, QoS, BLER requirement, reliability requirement, latency requirement, and/or processing time, (or control channel for scheduling the data channel corresponding thereto), are configured, DCI size alignment/adjustment may be performed as follows such that the number of different DCI sizes does not exceed the monitoring related capability of the UE for different DCI sizes.

For convenience of description, DCI (e.g., DCI field(s) included in the DCI, or DCI including DCI field(s) with size(s) configurable by the BS) included in the control channel corresponding to the specific target service, QoS, BLER requirement, reliability requirement, latency requirement, and/or processing time, (or control channel for scheduling the data channel corresponding thereto), will be referred hereinafter to as a "URLLC DCI format". DCI other than the "URLLC DCI format" will be referred to as a "non-URLLC DCI format". The "URLLC DCI format" may be referred to as a "configurable DCI format", and the "non-URLLC DCI format" may be referred to as a "non-configurable DCI format". Although the non-configurable DCI format may also include fields, sizes of which are changeable according to configuration, the size of a configurable field may be configured to be smaller in the configurable DCI format than in the non-configurable DCI format. A field which is non-configurable in the non-configurable DCI format may be included or may not be included in the configurable DCI format according to the necessity of the BS and its size may be adjusted according to the necessity of the BS. The non-configurable DCI format (e.g., non-URLLC DCI format) may comprise, for example, DCI format 0_0, DCI format 1_0, DCI format 0_1, and/or DCI format 1_1. For example, although a specific field or a few fields among fields constituting the DCI formats have fixed field size(s) for DCI format 0_0, DCI format 0_1, DCI format 1_1, and/or DCI format 0_1, field(s) for the configurable DCI format may be allowed to be included or not to be included in the corresponding format according to configuration of the BS. As another example, although a specific field or a few fields among the fields constituting the DCI formats may not be configured to have a very small number of bits in DCI format 0_0, DCI format 0_1, DCI format 1_1, and/or DCI format 0_1, a specific field or a few fields may be allowed to be configured by the BS so as to have a very small number of bits for the configurable DCI format. Since the "URLLC DCI format" is a newly introduced DCI format, the "URLLC DCI format" may be referred to as a "new DCI format" or "non-fallback DCI format", and DCI format 0_0, DCI format 0_1, DCI format 1_1, and/or DCI format 0_1 may be referred to as a "legacy DCI format" or "fallback DCI".

Examples of the present disclosure described below may be applied, in some scenarios, when the number of different DCI sizes that the UE is to monitor (e.g., the UE is to blind-decode) exceeds capability for the maximum number of different DCI sizes that the UE is capable of monitoring, due to the size of the URLLC DCI format, after the above-described first DCI size alignment procedure is ended. The following examples may be applied together in combination unless the examples are contradictory.

The BS may determine DCI sizes(s) to be used for DCI transmission based on the DCI size alignment procedure according to example(s) of the present disclosure. The BS may transmit DCI(s) (on a cell) based on the determined DCI size(s). The UE may determine DCI size(s) to be monitored (on a cell) based on the DCI size alignment procedure according to example(s) of the present disclosure. The UE may monitor DCI(s) (on the cell) based on the determined DCI size(s). When the DCI size alignment procedure is applied, the DCI size that the BS actually uses for transmission may be a DCI size obtained by completing DCI size alignment, and the DCI size that the UE actually monitors, i.e., the DCI size that the UE uses to decode the DCI, may be the DCI size obtained by completing DCI size alignment.

Figure 17:
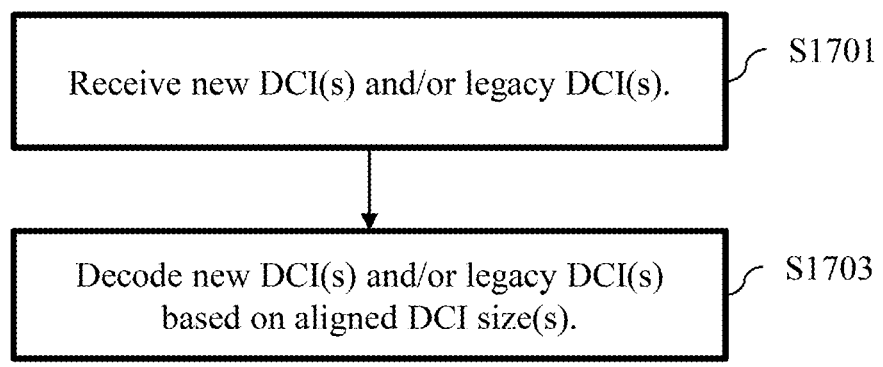
FIGS. 17 and 18 illustrate flows of operations of a UE and a BS based on some implementations of the present disclosure related to DCI size alignment.
Figure 18:
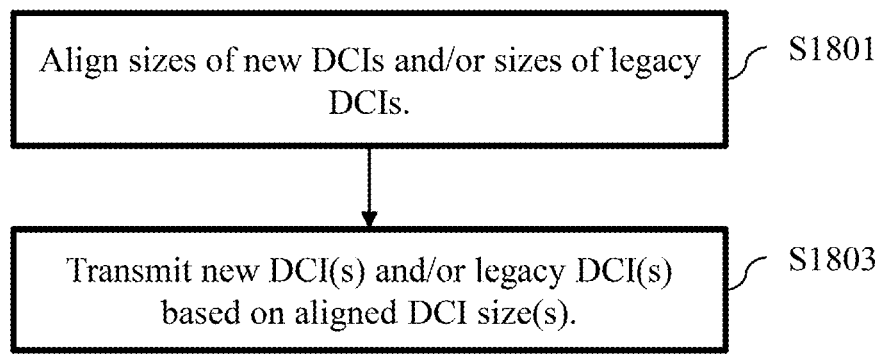

FIGS. 17 and 18 illustrate flows of operations of the UE and the BS based on some implementations of the present disclosure related to DCI size alignment. Particularly, FIG. 17 illustrates a flow of operation of the UE based on some implementations of the present disclosure related to DCI size alignment, and FIG. 18 illustrates a flow of operation of the BS based on some implementations of the present disclosure related to DCI size alignment.

In the present disclosure, new DCI may correspond to DCI of a URLLC DCI format (hereinafter, URLLC DCI), and legacy DCI may correspond to DCI of a non-URLLC DCI format (hereinafter, non-URLLC DCI). Here, the non-URLLC DCI may imply DCI with DCI formats other than the URLLC DCI format.

The UE may monitor DCI(s) (on a cell) based on aligned DCI size(s), for example, DCI size(s) determined based on a DCI size alignment procedure according to option(s) described later. For example, referring to FIG. 17, the UE may receive at least one of new DCI(s) and legacy DCI(s) (S1701) and decode the received DCI(s) based on aligned DCI size(s) according to the option(s) described later (S1703). The UE may transmit a UL channel such as a PUCCH or a PUSCH or receive a DL channel such as a PDSCH, based on the decoding result. Here, the UL channel and the DL channel may be channels of slot units or channels of mini-slot units. Alternatively, the UL channel and the DL channel may be channels for eMBB traffic or channels for URLLC traffic.

The BS may transmit the DCI(s) (on a cell) based on the aligned DCI size(s), for example, based on the DCI size(s) determined based on the DCI size alignment procedure according to the option(s) described later. For example, referring to FIG. 18, the BS may align the size(s) of the new DCI(s) and/or the size(s) of the legacy DCI(s) according to the option(s) described later (S1801). The BS may transmit the new DCI(s) and/or the legacy DCI(s) to the UE based on the aligned DCI size(s) (S1803). The BS may receive a UL channel such as a PUCCH or a PUSCH or transmit a DL channel such as a PDSCH, based on the transmitted DCI(s). Here, the UL channel and the DL channel may be channels of slot units or channels of mini-slot units. Alternatively, the UL channel and the DL channel may be channels for eMBB traffic or channels for URLLC traffic.

In the present disclosure, a DL DCI format may be a DCI format for scheduling or triggering DL transmission, and a UL DCI format may be a DCI format for scheduling or triggering UL transmission. For example, in the present disclosure, the DL DCI format may mean a DCI format for scheduling the PDSCH or a DCI format for triggering PUCCH transmission, and the UL DCI format may mean a DCI format for scheduling the PUSCH.

Option 1

Figure 19:
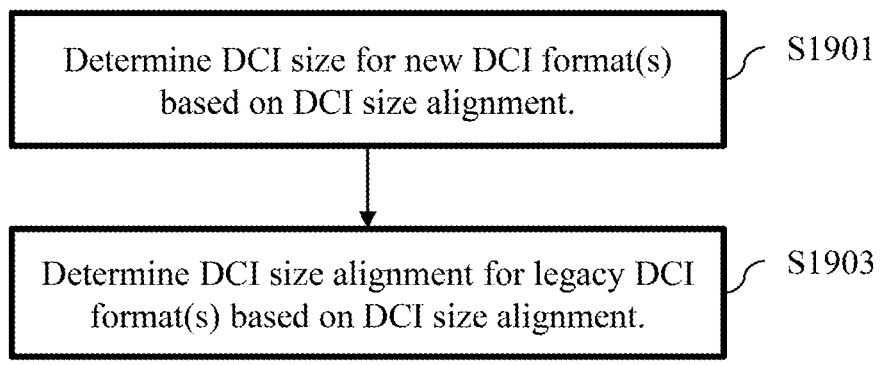
FIG. 19 illustrates a DCI size alignment procedure according to another example of the present disclosure.

FIG. 19 illustrates a DCI size alignment procedure according to an example of the present disclosure. Specifically, FIG. 19 illustrates a DCI size alignment procedure according to Option 1.

The size(s) of (a part or all of) DCI formats other than the URLLC DCI format may be adjusted such that the number of different DCI sizes does not exceed capability for the maximum number of different DCI sizes capable of being monitored by the UE. In some implementations of the present disclosure, the size(s) of DCI format(s) other than the URLLC DCI format may be adjusted after the size of a DL DCI format of the URLLC DCI format (hereinafter, URLLC DL DCI format) and the size of a UL DCI format of the URLLC DCI format (hereinafter, URLLC UL DCI format) are aligned. For example, referring to FIG. 19, the UE or BS may perform DCI size alignment for new DCI format(s) (S1901) and perform DCI size alignment for legacy format(s) (S1903). In some implementations of the present disclosure, DCI size alignment for the legacy format (s) may be performed when the sizes of the legacy DCI format(s) exceed capability for the maximum number of different DCI sizes capable of being monitored by the UE after DCI size alignment for the new DCI format(s) is applied. DCI size alignment may cause redundant bit(s) for a corresponding format or accompany scheduling restrictions. Since the URLLC DCI format usable for URLLC scheduling that will be expected to have a relatively sporadic traffic pattern will be used less frequently, an adverse effect of such DCI size matching may be minor with respect to the URLLC DCI format. Option 1 may be advantageous in that the adverse effect of DCI size matching is reduced by performing DCI size matching for the URLLC DCI format which is expected to have less frequency of use and then performing DCI size matching for other DCI formats (which are used relatively more frequently) only when a DCI size budget of the UE is exceeded.

When the sizes of other DCI formats are aligned after aligning the size of the URLLC DCI format, zero-bit padding or bit truncation may be applied so that the sizes of DCI format 1_1 and DCI format 0_1 are aligned. In this case, applying zero-bit padding or bit truncation may imply that a DCI size is aligned with the size of a DCI format having a larger number bits by applying zero-bit padding to a DCI format having a smaller number of bits among DCI format 1_1 and DCI format 0_1 or the DCI size is aligned with the size of a DCI format having a smaller number of bits by truncating a part of bit(s) of a DCI format having a larger number of bits among DCI format 1_1 and DCI format 0_1.

In some implementations related to Option 1, truncation may be applied to a DCI format X, so that the size of a URLLC DL DCI format and/or the size of a URLLC UL DCI format may be aligned with the size of the DCI format X having a minimum size among DCI format(s) having a larger number of bits than the size of the URLLC DL DCI format and/or the size of the URLLC UL DCI format. Only when such DCI size alignment is applied, a 1-bit flag may be included in DCI to distinguish between the DCI format X and the URLLC DCI format, or the DCI format X and the URLLC DCI format may be configured to be monitored in different SSs, RNTIs, CORESETs, and/or monitoring occasions (hereinafter, SSs/RNTIs/CORESETs/MOs). In some implementations of the present disclosure, the DCI format X may not include DCI format 0_0 and DCI format 1_0 monitored in a CSS (and/or a USS).

In some implementations related to Option 1, zero-bit padding may be applied to a DCI format Y, so that the size of the URLLC DL DCI format and/or the size of the URLLC UL DCI format may be aligned with the size of the DCI format Y having a maximum size among DCI format(s) having a smaller number of bits than the size of the URLLC DL DCI format and/or the size of the URLLC UL DCI format. Only when such DCI size alignment is applied, a 1-bit flag may be included in DCI to distinguish between the DCI format Y and the URLLC DCI format, or the DCI format Y and the URLLC DCI format may be configured to be monitored in different SSs/RNTIs/CORESETs/MOs. In some implementations of the present disclosure, the DCI format Y may not comprise DCI format 0_0 and DCI format 1_0 monitored in CSS (and/or USS).

In some implementations related to Option 1, if the difference in number of bits between the size of the URLLC DL DCI format and/or the size of the URLLC UL DCI format and the DCI format X having a minimum size among DCI formats having a larger number of bits than the size of the URLLC DL DCI format and/or the size of the URLLC UL DCI format is "a" and if the difference in number of bits between the size of the URLLC DL DCI format and/or the size of the URLLC UL DCI format and the DCI format Y having a maximum size among DCI formats having a smaller number of bits than the size of the URLLC DL DCI format and/or the size of the URLLC UL DCI format is "b", truncation may be applied to the DCI format X if a<b (or a<=b) and zero-bit padding may be applied to the DCI format Y if a>b (or a>=b). Alternatively, when a is larger (or smaller) than a predetermined value, truncation may be applied to the DCI format X and, otherwise, zero-bit padding may be applied to the DCI format Y. Only when such DCI size alignment is applied, a 1-bit flag may be included in each DCI in order to distinguish between i) the DCI format X/DCI format Y and ii) the URLLC DCI format, or i) the DCI format X/DCI format Y and ii) the URLLC DCI format may be configured to be monitored in different SSs/RNTIs/CORESETs/MOs.

Option 2

The size of the URLLC DCI format may be adjusted to be equal to the size(s) of (a part or all of) DCI formats other than the URLLC DCI format, such that the number of different DCI sizes does not exceed capability for the maximum number of different DCI sizes capable of being monitored by the UE. In some implementations of the present disclosure, Option 2 may be applied after size alignment for the URLLC DL DCI format and the URLLC UL DCI format is performed. For example, size alignment of the URLLC DL DCI format and the URLLC UL DCI format may be applied only to the case in which DCI format 1_1 and/or DCI format 0_1 is not configured to be monitored.

In some implementations related to Option 2, zero-bit padding may be applied to the URLLC DL DCI format and/or the URLLC UL DCI format, so that the size of the URLLC DL DCI format and/or the size of the URLLC UL DCI format may be aligned with the size of a DCI format Z having a minimum size among DCI format(s) having a larger number of bits than the size of the URLLC DL DCI format and/or the size of the URLLC UL DCI format. Only when such DCI size alignment is applied, a 1-bit flag may be included in DCI to distinguish between the DCI format Z and the URLLC DCI format, or the DCI format Z and the URLLC DCI format may be configured to be monitored in different SSs/RNTIs/CORESETs/MOs.

In some implementations related to Option 2, truncation may be applied to the URLLC DL DCI format and/or the URLLC UL DCI format, so that the size of the URLLC DL DCI format and/or the size of the URLLC UL DCI format may be aligned with the size of a DCI format W having a maximum size among DCI format(s) having a smaller number of bits than the size of the URLLC DL DCI format and/or the size of the URLLC UL DCI format. Only when such DCI size alignment is applied, a 1-bit flag may be included in DCI to distinguish between the DCI format W and the URLLC DCI format, or the DCI format W and the URLLC DCI format may be configured to be monitored in different SSs/RNTIs/CORESETs/MOs. For example, such truncation may be applied only when the size of the URLLC DL DCI format and/or the size of the URLLC UL DCI format is larger than the maximum size among other DCI formats.

In some implementations related to Option 2, if the difference in number of bits between the size of the URLLC DL DCI format and/or the size of the URLLC UL DCI format and a DCI format having a minimum size among DCI formats having a larger number of bits than the size of the URLLC DL DCI format and/or the size of the URLLC UL DCI format is "a" and if the difference in number of bits between the size of the URLLC DL DCI format and/or the size of the URLLC UL DCI format and a DCI format having a maximum size among DCI formats having a smaller number of bits than the size of the URLLC DL DCI format and/or the size of the URLLC UL DCI format is "b", zero padding may be applied to the URLLC DL DCI format and/or the URLLC UL DCI format if a<b (or a<=b) and truncation may be applied to the URLLC DL DCI format and/or the URLLC UL DCI format if a>b (or a>=b). Alternatively, when a is larger (or smaller) than a predetermined value, zero padding may be applied to the URLLC DL DCI format and/or the URLLC UL DCI format and, otherwise, truncation may be applied to the URLLC DL DCI format and/or the URLLC UL DCI format.

Option 3

The maximum number of different DCI sizes capable of being monitored by the UE, except for the size of the URLLC DCI format, may be separately defined. For example, the UE does not expect that a larger number of different DCI sizes than 3 will be configured to be monitored in a cell in which the URLLC DCI format is configured to be monitored. Additionally or alternatively, the UE does not expect that a larger number of different DCI sizes (CRC-scrambled with C-RNTI) except for the size of the URLLC DCI format will be configured to be monitored in a specific cell. In contrast, this rule may not be applied to a cell in which the URLLC DCI format is not configured to be monitored. The UE and the BS may conform to the maximum number of different DCI sizes defined by the existing rule in the cell in which the URLLC DCI format is not configured to be monitored.

Option 4

As another method, after the first DCI size alignment procedure is ended, if different DCI sizes (CRC-scrambled with a C-RNTI) monitored by the UE exceed the UE capability due to the size of the URLLC DCI format, the UE and the BS may:

(4-1) apply zero-bit padding or bit truncation (or reinterpretation of a DCI field for DCI size alignment) to DCI format 1_1 or DCI format 0_1 when the size of DCI format 0_1 and the size of DCI format 1_1 differ, so that the size of DCI format 1_1 and the size of DCI format 0_1 may be aligned; or (4-2) when the size of DCI format 0_1 is equal to the size of DCI format 1_1, remove the zero padding applied to DCI format 1_1 and DCI format 0_1, determine again the size of DCI format 1_0 monitored in a USS and the size of DCI format 0_0 monitored in the USS, based on the size of an initial DL/UL BWP or CORESET #0, and apply zero-bit padding or bit truncation to DCI format 0_0 monitored in USS so that the size of DCI format 1_0 monitored in USS and the size of DCI format 0_0 monitored in USS may be aligned.

Figure 20:
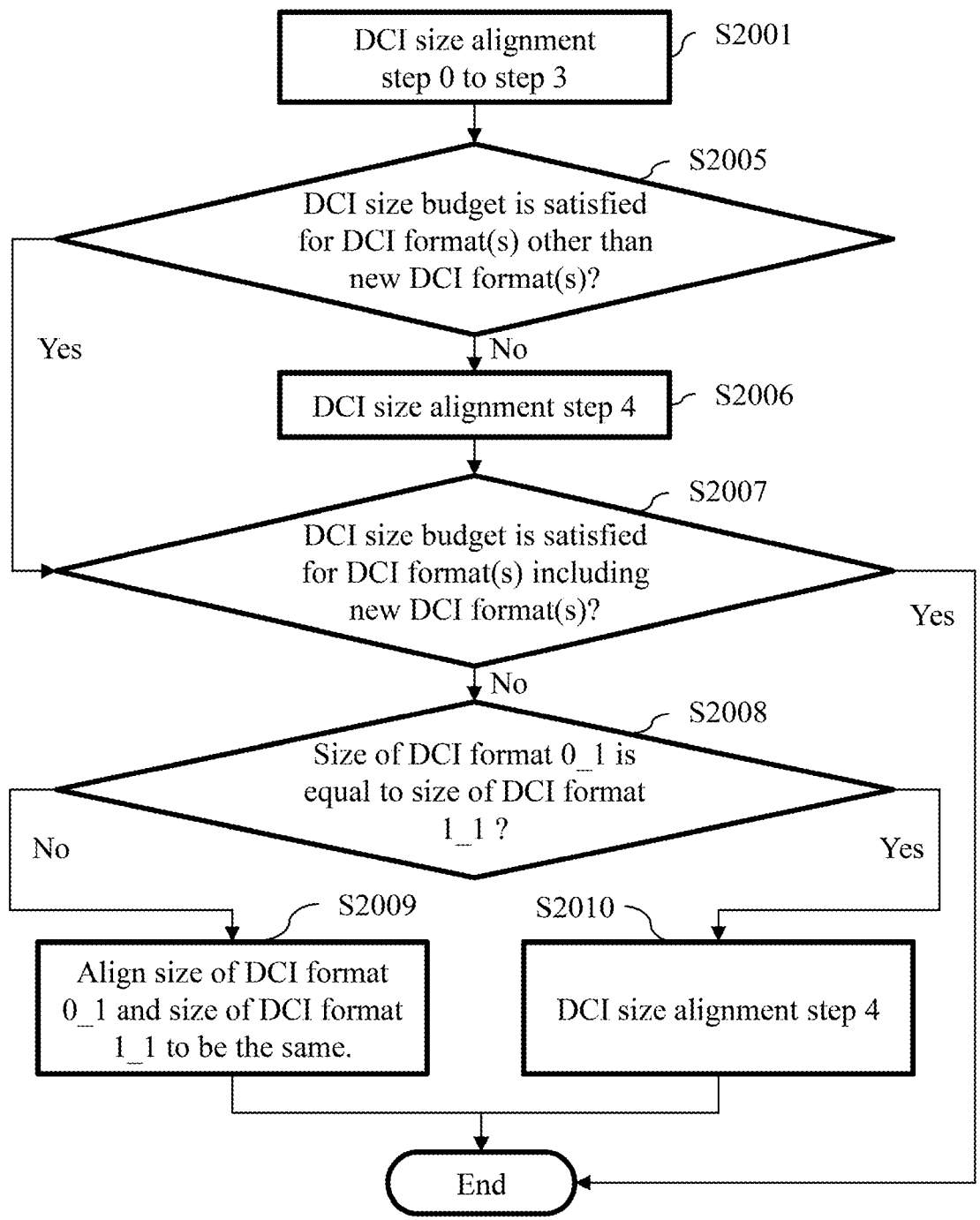
FIG. 20 illustrates a DCI size alignment procedure according to another example of the present disclosure.

FIG. 20 illustrates a DCI size alignment procedure according to an example of the present disclosure. Specifically, FIG. 20 illustrates a DCI size alignment procedure according to Option 4. In FIG. 20, a new DCI format may correspond to a URLLC DCI format.

Figure 21:
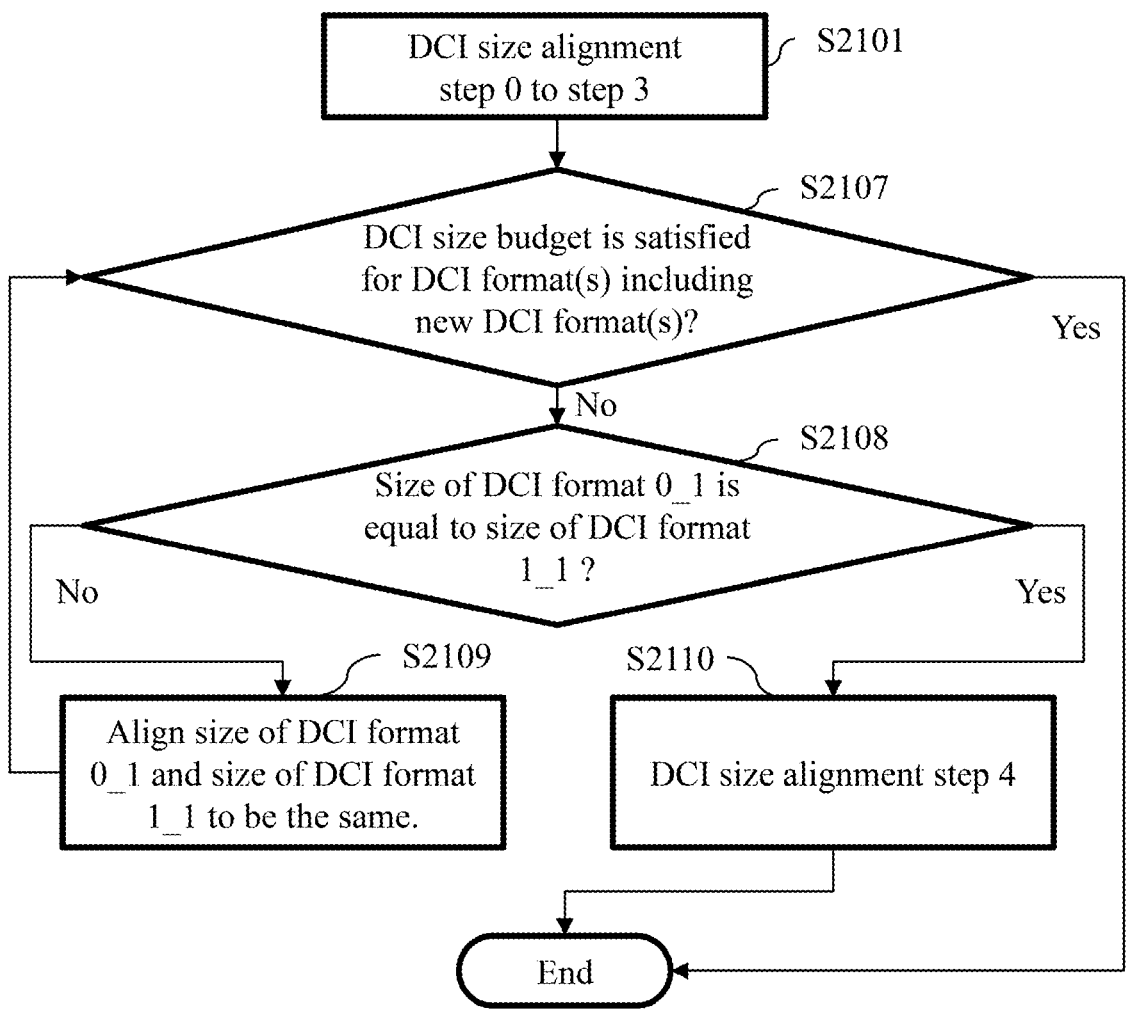
FIGS. 21 and 22 illustrate DCI size alignment procedures according to other examples of the present disclosure.
Figure 22:
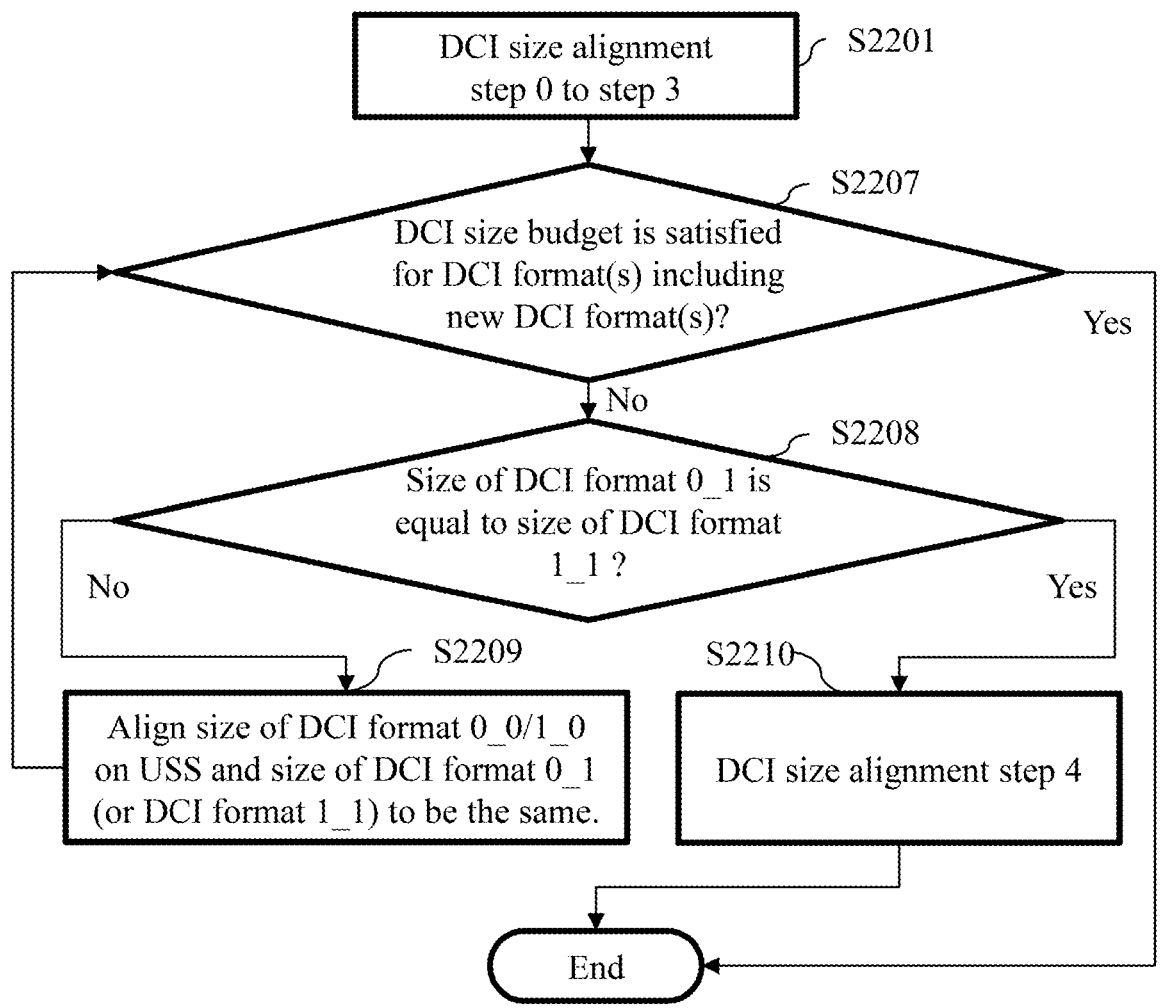

Referring to FIG. 20, for example, the BS and the UE may perform Step 0 to Step 3 of the first DCI size alignment procedure (S2001). Next, if a DCI size budget for DCI format(s) other than the new DCI format is not satisfied (S2005, No), the BS and the UE may perform Step 4 of the first DCI alignment procedure (S2006). After Step 0 to Step 3 of the first DCI size alignment procedure are performed, if the DCI size budget for DCI format(s) other than the new DCI format is satisfied (S2005, Yes) and the DCI size budget for DCI formats including the new DCI format is satisfied (S2007, Yes), the BS and the UE may end the DCI size alignment procedure. After Step 0 to Step 3 of the first DCI size alignment procedure are performed, if the DCI size budget for DCI format(s) other than the new DCI format is satisfied (S2005, Yes), the DCI size budget for DCI formats including the new DCI format is not satisfied (S2007, No), and the size of DCI format 0_1 is not equal to the size of DCI format 1_1 (S2008, No), then the BS and the UE perform alignment such that the size of DCI format 0_1 may be equal to the size of the DCI format 1_1 (S2009). After Step 0 to Step 3 of the DCI size alignment procedure are performed, if the DCI size budget for DCI format(s) other than the new DCI format is not satisfied (S2007, No) and the size of DCI format 0_1 is equal to the size of DCI format 1_1 (S2008, Yes), the B S and the UE may perform Step 4 of the first size alignment procedure (S2010). Here, the BS and the UE may determine whether the DCI size budget for DCI format(s) is satisfied based on whether the following conditions are fulfilled:
  i) the total number of different DCI sizes configured to be monitored is not larger than X+1 for a corresponding cell;
  ii) the total number of different DCI sizes with a C-RNTI configured to be monitored is not larger than X for the cell.
  In some scenarios, X may be 3.
  Option 5
  FIGS. 21 and 22 illustrate DCI size alignment procedures according to other examples of the present disclosure. Particularly, FIGS. 21 and 22 illustrate DCI size alignment procedures according to Option 5. In FIGS. 21 and 22, a new DCI format may correspond to a URLLC DCI format.
  As another method, after Step 3 of the first DCI size alignment procedure is ended, if the number of different DCI sizes exceeds capability for different DCI sizes (CRC-scrambled with the C-RNTI) capable of being monitored by the UE due to the size of the URLLC DCI format:
    (5-1) when the size of DCI format 0_1 and the size of DCI format 1_1 differ:
    (5-1-1) the UE and the BS may apply zero-bit padding or bit truncation (or reinterpretation of the DCI field for DCI size alignment) to DCI format 1_1 or DCI format 0_1 so that the size of DCI format 1_1 and the size of DCI format 0_1 may be aligned. In this case, if the size of DCI format 1_0/0_0 monitored in a CSS is equal to the size of one of DCI format 1_1 and DCI format 0_1, zero-bit padding or bit truncation (and/or reinterpretation of the DCI field for DCI size alignment) may be applied to the other DCI format which is not equal to the size of DCI format 1_0/0_0 monitored in the CSS. This serves to prevent the total DCI size from not being reduced even if zero-bit padding or bit truncation (and/or reinterpretation of the DCI field for DCI size alignment) is applied to the DCI format which is equal to the size of DCI format 1_0/0_0 monitored in the CSS.
    (5-1-2) Alternatively, the UE and the BS may apply zero-bit padding or bit truncation (and/or reinterpretation of the DCI field for DCI size alignment) to DCI format 1_0 and DCI format 0_0, DCI format 1_1, or DCI format 0_1, monitored in the USS, so that the size of DCI format 1_0 monitored in the USS and the size of DCI format 0_0 monitored in the USS are equal to the size of either DCI format 1_1 or DCI format 0_1.
  Referring to FIG. 21, the BS and the UE may perform, for example, Step 0 to Step 3 of the first DCI size alignment procedure (S2101). After Step 0 to Step 3 of the first DCI size alignment procedure are performed, if the DCI size budget for other DCI format(s) including the new DCI format is satisfied (S2107, Yes), the BS and the UE may end the DCI size alignment procedure, After Step 0 to Step 3 of the first DCI size alignment procedure are performed, if the DCI size budget for the DCI format(s) including the new DCI format is not satisfied (S2107, No) and if the size of DCI format 0_1 is not equal to the size of DCI format 1_1 (S2108, No), the BS and the UE perform alignment so that the size of DCI format 0_1 is equal to the size of DCI format 1_1 (S2109). After Step 0 to Step 3 of the first DCI size alignment procedure are performed, if the DCI size budget for the DCI format(s) including the new DCI format is not satisfied (S2107, No) and if the size of DCI format 0_1 is equal to the size of DCI format 1_1 (S2108, Yes), the BS and the UE may perform Step 4 of the first size alignment procedure (S2110). Here, the BS and the BS and the UE may determine whether the DCI size budget for DCI format(s) is satisfied based on whether following conditions are fulfilled:
    i) the total number of different DCI sizes configured to be monitored is not larger than X+1 for a corresponding cell;
    ii) the total number of different DCI sizes with a C-RNTI configured to be monitored is not larger than X for the cell.
  In some scenarios, X may be 3.
  After Step 3 of the first DCI size alignment procedure is ended, if the number of different DCI sizes exceeds capability for different DCI sizes (CRC-scrambled with a C-RNTI) capable of being monitored by the UE due to the size of the URLLC DCI format, the UE and the BS may:
    (5-2) when the size of DCI format 0_1 is equal to the size of DCI format 1_1, remove zero padding applied to DCI format 1_1 and DCI format 0_1, determine again the size of DCI format 1_0 and the size of DCI format 0_0, monitored in the USS, based on the size of an initial DL/UL BWP or CORESET #0, and apply zero-bit padding or bit truncation to DCI format 0_0 monitored in the USS so that the size of DCI format 1_0 monitored in the USS and the size of DCI format 0_0 monitored in the USS may be aligned.
  Referring to FIG. 22, the BS and the UE may perform, as another example, Step 0 to Step 3 of the first DCI size alignment procedure (S2201). After Step 0 to Step 3 of the first DCI size alignment procedure are performed, if the DCI size budget for other DCI format(s) including the new DCI format is satisfied (S2207, Yes), the BS and the UE may end the DCI size alignment procedure, After Step 0 to Step 3 of the first DCI size alignment procedure are performed, if the DCI size budget for the DCI format(s) including the new DCI format is not satisfied (S2207, No) and if the size of DCI format 0_1 is not equal to the size of DCI format 1_1 (S2208, No), the BS and the UE perform alignment so that the size of DCI format 0_0/1_0 is equal to the size of DCI format 0_1 (or DCI format 1_1) (S2209). After Step 0 to Step 3 of the first DCI size alignment procedure are performed, if the DCI size budget for the DCI format(s) including the new DCI format is not satisfied (S2207, No) and if the size of DCI format 0_1 is equal to the size of DCI format 1_1 (S2208, Yes), the BS and the UE may perform Step 4 of the first size alignment procedure (S2210). Here, the BS and the BS and the UE may determine whether the DCI size budget for DCI format(s) is satisfied based on whether following conditions are fulfilled:
    i) the total number of different DCI sizes configured to be monitored is not larger than X+1 for a corresponding cell;
    ii) the total number of different DCI sizes with a C-RNTI configured to be monitored is not larger than X for the cell.
  In some scenarios, X may be 3.
  In Option 1 to Option 5, the DCI format of the URLLC DCI may be a new DCI format distinguished from the DCI format(s) mentioned in the first DCI alignment procedure or from the DCI format(s) shown in Table 13. Alternatively, the URLLC DCI in Option 1 to Option 5 may have the same DCI format as the DCI format mentioned in the first DCI alignment procedure or the DCI format shown in Table 13 but may be distinguished from the DCI of the DCI format mentioned in the first DCI alignment procedure or the DCI of the DCI format shown in Table 13, by configuration of an RNTI, a search space, and/or a CORESET (for scheduling URLLC traffic).

<DCI Parameter Selection>
  When a target service (e.g., URLLC), QoS, BLER requirement, reliability requirement, latency requirement, and/or processing time, for a specific channel, is different, parameter(s) (and/or candidate values of each parameter) used for scheduling may also need to be different. For example, a relatively large PDSCH-to-HARQ feedback timing value may be needed to schedule eMBB traffic, whereas a relatively small PDSCH-to-HARQ feedback timing value may be needed to schedule URLLC traffic.

Figure 23:
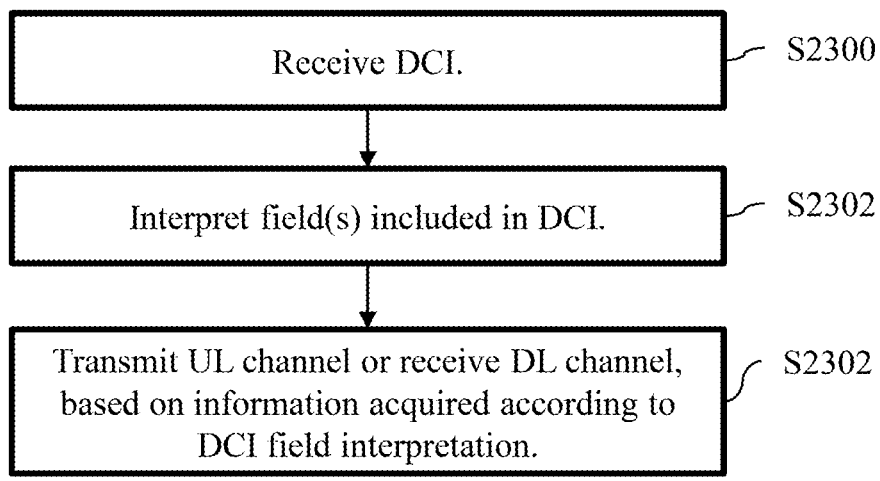
FIGS. 23 and 24 illustrate flows of operations of a UE and a BS based on some implementations of the present disclosure related to DCI parameter selection.
Figure 24:
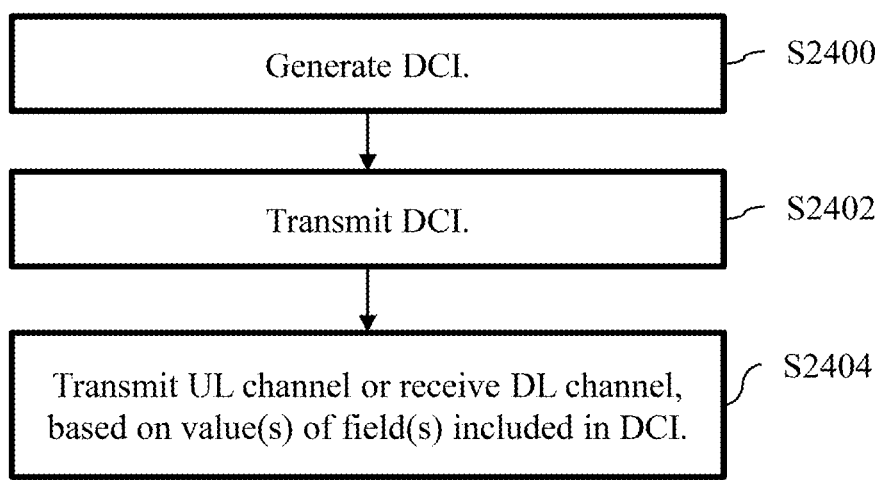

FIGS. 23 and 24 illustrate flows of operations of the UE and the BS based on some implementations of the present disclosure related to DCI parameter selection. Particularly, FIG. 23 illustrates the flow of the operation of the UE based on some implementations of the present disclosure related to DCI parameter selection and FIG. 24 illustrates the flow of the operation of the BS based on some implementations of the present disclosure related to DCI parameter selection Referring to FIG. 23, the UE may receive DCI from the BS (S2300). The UE may interpret field(s) included in the DCI according to some examples described later. For example, the UE may interpret the DCI based on a search space in which the DCI is transmitted, a CORESET, an RNTI, and/or value(s) included in fields other than the field(s) that the UE intends to interpret (S2302). The UE may transmit a UL channel or receive a DL channel based on information obtained by interpreting the field(s) (S2304).

Referring to FIG. 24, the BS may generate DCI (S2400). To schedule a UL/DL channel, a field value included in the DCI may be determined according to examples described later. For example, the DCI may be generated by determining field value(s) included in the DCI, based on a search space to which the DCI is to be transmitted, a CORESET, an RNTI, and/or value(s) included in field(s) other than field(s) to be interpreted. Then, the BS may transmit the generated DCI (S2402). According to examples described later, since scheduling interpretation of the UL/DL channel differs according to field value(s) derived from the search space to which the DCI is transmitted, the CORESET, the RNTI, and/or the value(s) included in the field(s) other than the field(s) to be interpreted, the BS may receive the UL channel from the UE or transmit the DL channel to the UE (S2404). For example, if an arbitrary field in the DCI is field B and another field is field A, the value of the field B may be derived from a search space to which the DCI is transmitted, a CORESET, an RNTI, and/or values included in field A.

Hereinafter, some examples of generating/determining/interpreting field(s) included in the DCI will be described.

A value of a field constituting a specific DCI format (or a value of a parameter not included in a DCI format), a range of the value, a candidate set (list) of the value, and/or the size of the field may be differently predefined/predetermined, may be configured through a higher layer signal, or may be indicated to the UE through a physical layer signal (or MAC CE), depending on each state explicitly indicated through a specific field of the DCI, each search space to which a PDCCH (for scheduling DL/UL data) belongs, each CORESET to which the PDCCH (for scheduling the DL/UL data) belongs, each RNTI, and/or each CRC masking of the PDCCH. The BS may transmit the PDCCH while expecting such a UE operation.

For example, when a PDCCH is detected in a search space A, a candidate value set of {m1, m2, m3, m4} may be configured for a field m of a DCI format X. In contrast, when the PDCCH is detected in a search space B, a candidate value set of {m5, m6, m7, m8} may be configured for the field m of the DCI format X. As another example, when a CRC-scrambled PDCCH with an RNTI g is detected, field size N1 is determined for a field n of a DCI format Y. In contrast, when the CRC-scrambled PDCCH with an RNTI h is detected, field size N2 may be determined for the field n of the DCI format Y. As another example, if a value of another field k is 0, a candidate value of {p1, p2, ..., p8} may be configured for a field p of a DCI format Z and, if the value of the field k is 1, a candidate value of {p9, p10, ..., p16} may be configured for the p of the DCI format Z. As another example, a plurality of values may be configured even for a specific parameter not included in a DCI format W and which value among the values will be used may be determined according to the value of another field k.

The operation of differently configuring a value of a field constituting the specific DCI format, a range of the value, a candidate set (list) of the value, and/or the size of the field may be more usefully applied when a new additional DCI format is not defined for scheduling for a specific target service (e.g., URLLC), QoS, BLER requirement, reliability requirement, latency requirement, and/or processing time.

Figure 25:
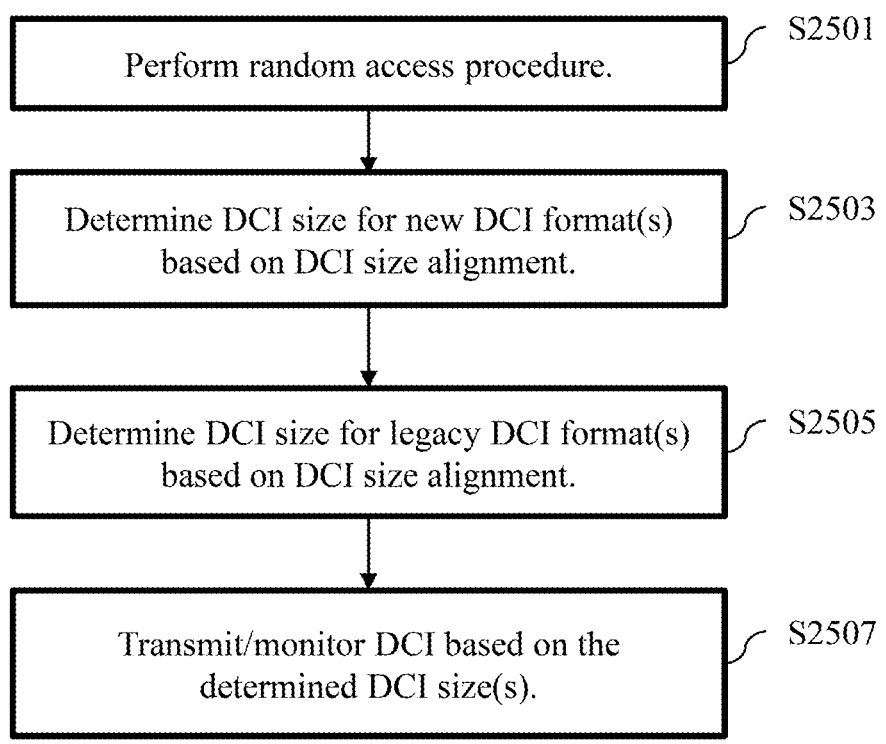
FIG. 25 illustrates another example of a DCI transmission/reception flow according to some implementations of the present disclosure.

FIG. 25 illustrates another example of a DCI transmission/reception flow according to some implementations of the present disclosure.

The UE may perform a random access procedure with respect to the network (e.g., BS) (S2501). For example, when there are no available UL resources for UL data transmission by the UE or when the network transmits a paging message for the UE, the UE may perform the random access procedure on a cell. The random access procedure may be, for example, the 4-step random access procedure (refer to FIG. 5(a)) or the 2-step random access procedure (refer to FIG. 5(b)). The random access procedure may include, for example, transmitting a random access preamble on an RACH occasion (i.e., RACH resource) associated with an SSB detected on a cell among RACH occasions available to the UE on the cell UE. The random access procedure may include receiving an RAR related to the random access preamble. In some scenarios, the random access procedure may include performing UL transmission based on a UL grant included in the RAR.

The BS may perform DCI transmission according to some implementations of the present disclosure to the UE that has performed the random access procedure. The UE that has performed the random access procedure may perform DCI reception according to some implementations of the present disclosure. In some implementations of the present disclosure, if an RRC connection is established between the BS and the UE through the random access procedure, the BS may provide the UE with configuration information related to field(s) of a new DCI format through RRC signaling.

The UE may perform operations according to some implementations of the present disclosure to receive DCI. The UE may comprise: at least one transceiver; at least one processor; and at least one computer memory operably connected to the at least one processor and configured to store instructions for causing, when executed, the at least one processor to perform operations according to some implementations of the present disclosure. A processing apparatus for the UE may comprise: at least one processor; and at least one computer memory operably connected to the at least one processor and configured to store instructions for causing, when executed, the at least one processor to perform the operations according to some implementations of the present disclosure. A computer readable storage medium may store at least one computer program including instructions for causing, when executed by at least one processor, the at least one processor to perform the operations according to some implementations of the present disclosure. In some implementations of the present disclosure, the operations may comprise: transmitting/receiving signals related to a random access procedure from the UE (S2501). For example, among operations according to some implementations of the present disclosure, the operations related to the random access procedure may include: detecting a synchronization signal and physical broadcast channel block (SSB);

transmitting a preamble of the random access procedure on a random access resource associated with the SSB; receiving a random access response associated with the random access preamble; and establishing an RRC connection based on a UL grant included in the random access response.

In some implementations of the present disclosure, the operations may comprise establishing the RRC connection and determining a first DCI size based on a size of a new UL DCI format and a size of a new DL DCI format (S2503); determining a second DCI size based on a size of a legacy UL DCI format and a size of a legacy DL DCI format, based on determination of the first DCI size based on the size of the new UL DCI format and the size of the new DL DCI format (S2505); and receiving at least one DCI by monitoring (attempting to decode) DCI format(s) based on the first DCI size and the second DCI size (S2507). Each of the new UL DCI format and the legacy UL DCI format may be a DCI format used to schedule a physical uplink shared channel (PUSCH). Each of the new DL DCI format and the legacy DL DCI format may be a DCI format used to schedule a physical downlink shared channel (PDSCH). The operations may comprise transmitting random access resource information about a random access resource for each SSB of a cell. The operations may comprise receiving the preamble based on the random access resource information. The first DCI size may be one of the size of the new UL DCI format and the size of the new DL DCI format. The second DCI size may be one of the size of the legacy UL DCI format and the size of the legacy DL DCI format. The new UL DCI format may be configured to include or not to include at least one field having a fixed size among fields in the legacy UL DCI format. The new DL DCI format may be configured to include or not to include at least one field having a fixed size among fields in the legacy DL DCI format. The size of the new UL DCI format may be configured to be smaller than the size of the legacy UL DCI format. The size of the new DL DCI format may be configured to be smaller than the size of the legacy DL DCI format. Determining the second DCI based on the size of the legacy UL DCI format and the size of the legacy DL DCI format includes determining the second DCI based on the size of the legacy UL DCI format and the size of the legacy DL DCI format, based on i) determination of the first DCI size based on the size of the new UL DCI format and the size of the new UL DCI format, and ii) non-fulfillment of conditions. The conditions may comprise conditions that: i) a total number of different DCI sizes configured to be monitored by the UE is not larger than X+1 for a cell, and ii) a total number of different DCI sizes configured to be monitored by the UE with a cell radio network temporary identifier (C-RNTI) is not larger than X for the cell. The receiving the at least one DCI may include monitoring DCI of the new UL DCI format or DCI of the new DL DCI format based on the first DCI size. The legacy UL DCI format may be DCI format 0_1, and the new UL DCI format may be a DCI format different from DCI format 0_0 and DCI format 0_1. The legacy DL DCI format may be DCI format 1_1, and the new DL DCI format may be a DCI format different from DCI format 1_0 and DCI format 1_1.

The BS may perform operations according to some implementations of the present disclosure to transmit DCI. The BS may comprise at least one transceiver; at least one processor; and at least one computer memory operably connected to the at least one processor and configured to store instructions for causing, when executed, the at least one processor to perform operations according to some implementations of the present disclosure. A processing apparatus for the BS may comprise: at least one processor; and at least one computer memory operably connected to the at least one processor and configured to store instructions for causing, when executed, the at least one processor to perform the operations according to some implementations of the present disclosure. A computer readable storage medium may store at least one computer program including instructions for causing, when executed by at least one processor, the at least one processor to perform the operations according to some implementations of the present disclosure. In some implementations of the present disclosure, the operations may comprise: performing a random access procedure (S2501). For example, operations related to the random access procedure among operations according to some implementations of the present disclosure may include: transmitting one or more SSBs; receiving a preamble of the random access procedure from a UE on a random access resource related to one of the one or more SSBs; transmitting a random access response related to the random access preamble to the UE; and establishing an RRC connection with the UE based on a UL grant included in the random access response.

In some implementations of the present disclosure, the operations may comprise: establishing the RRC connection with the UE and aligning a size of a new UL DCI format and a size of a new downlink (DL) DCI format with a first DCI size (S2503); aligning a size of a legacy UL DCI format and a size of a legacy DL DCI format with a second DCI size, based on aligning the size of the new UL DCI format and the size of the new DL DCI format with the first DCI size (S2505); and transmitting at least one DCI based on the first DCI size and the second DCI size (S2507). Each of the new UL DCI format and the legacy UL DCI format may be a DCI format used to schedule a PUSCH, and each of the new DL DCI format and the legacy DL DCI format may be a DCI format used to schedule a PDSCH. The operations may comprise transmitting random access resource information about a random access resource for each SSB of a cell. The operations may comprise receiving the preamble based on the random access resource information. The first DCI size may be one of the size of the new UL DCI format and the new DL DCI format. The second DCI size may be one of the size of the legacy UL DCI format and the legacy DL DCI format. The new UL DCI format may be configured to include or not to include at least one field having a fixed field size among fields in the legacy UL DCI format. The new DL DCI format may be configured to include or not to include at least one field having a fixed field size among fields in the legacy DL DCI format. The BS may configure the size of the new UL DCI format to be smaller than the size of the legacy UL DCI format for the UE. The BS may configure the size of the new DL DCI format to be smaller than the size of the legacy DL DCI format. The aligning the size of the legacy UL DCI format and the size of the legacy DL DCI format with the second DCI size includes aligning the size of the legacy UL DCI format and the size of the legacy DL DCI format with the second DCI size, based on i) aligning the size of the new UL DCI format and the size of the new UL DCI format with the first DCI size, and ii) non-fulfillment of conditions. The conditions may comprise conditions that: a total number of different DCI sizes configured to be monitored by the UE is not larger than X+1 for a cell, and a total number of different DCI sizes configured to be monitored by the UE with a cell radio network temporary identifier (C-RNTI) is not larger than X for the cell. Transmitting the at least one DCI may comprise: transmitting DCI of the new UL DCI format or DCI of the new DL DCI format based on the first DCI size. The legacy UL DCI format may be DCI format 0_1, and the new UL DCI format may be a DCI format different from DCI format 0_0 and the DCI format 0_1. The legacy DL DCI format may be DCI format 1_1, and the new DL DCI format may be a DCI format different from DCI format 1_0 and the DCI format 1_1.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method of transmitting downlink control information (DCI) by a base station (BS) in a wireless communication system, the method comprising:
    performing DCI size alignment to adjust DCI sizes of DCI formats to be monitored by a user equipment (UE); and
    transmitting at least one DCI based on the DCI size alignment,
    wherein performing the DCI size alignment comprises:
        aligning a size of a new uplink (UL) DCI format and a size of a new downlink (DL) DCI format with a first DCI size; and
        aligning a size of a legacy UL DCI format and a size of a legacy DL DCI format with a second DCI size, based on i) aligning the size of the new UL DCI format and the size of the new DL DCI format with the first DCI size and ii) a total number of different DCI sizes to be monitored by the UE exceeding a predetermined number for a cell,
    wherein each of the new UL DCI format and the legacy UL DCI format is a DCI format used to schedule a physical uplink shared channel (PUSCH), and
    wherein each of the new DL DCI format and the legacy DL DCI format is a DCI format used to schedule a physical downlink shared channel (PDSCH).

2. The method of claim 1,
    wherein the first DCI size is one of the size of the new UL DCI format and the size of the new DL DCI format, and
    wherein the second DCI size is one of the size of the legacy UL DCI format and the size of the legacy DL DCI format.

3. The method of claim 1,
    wherein the new UL DCI format is configured to include or not to include at least one field having a fixed field size among fields in the legacy UL DCI format.

4. The method of claim 1,
    wherein the new DL DCI format is configured to include or not to include at least one field having a fixed field size among fields in the legacy DL DCI format.

5. The method of claim 1,
    wherein aligning the size of the legacy UL DCI format and the size of the legacy DL DCI format with the second DCI size with the second DCI size includes aligning the size of the legacy UL DCI format and the size of the legacy DL DCI format with the second DCI size, based on:
        i) aligning the size of the new UL DCI format and the size of the new DL DCI format with the first DCI size, and
        ii) non-fulfillment of conditions after aligning the size of the new UL DCI format with the size of the new DL DCI format to be the first DCI size, and
    wherein the conditions comprise conditions that:
        a total number of different DCI sizes configured to be monitored by the UE is not larger than X+1 for the cell, and
        a total number of different DCI sizes configured to be monitored by the UE with a cell radio network temporary identifier (C-RNTI) is not larger than X for the cell.

6. The method of claim 5,
    wherein the legacy UL DCI format is DCI format 0_1, and the new UL DCI format is a DCI format different from DCI format 0_0 and the DCI format 0_1, and
    wherein the legacy DL DCI format is DCI format 1_1, and the new DL DCI format is a DCI format different from DCI format 1_0 and the DCI format 1_1.

7. The method of claim 1,
    wherein transmitting the at least one DCI includes:
    transmitting DCI of the new UL DCI format or DCI of the new DL DCI format based on the first DCI size.

8. The method of claim 1, wherein aligning the size of the new UL DCI format and the size of the new DL DCI format with the first DCI size includes aligning the size of the new UL DCI format and the size of the new DL DCI format with the first DCI size, based on:
    i) aligning a size of DCI format 0_0 and a size of DCI format 1_0 with a third DCI size, and
    ii) non-fulfillment of conditions after aligning the size of DCI format 0_0 and the size of DCI format 1_0 with the third DCI size, and
    wherein the conditions comprise conditions that:
        a total number of different DCI sizes configured to be monitored by the UE is not larger than X+1 for the cell, and
        a total number of different DCI sizes configured to be monitored by the UE with a cell radio network temporary identifier (C-RNTI) is not larger than X for the cell.

9. A method of receiving downlink control information (DCI) by a user equipment (UE) in a wireless communication system, the method comprising:
    performing DCI size alignment to adjust DCI sizes of DCI formats to be monitored by the (UE); and
    receiving at least one DCI based on the DCI size alignment,
    wherein performing the DCI size alignment comprises:
        aligning a size of a new uplink (UL) DCI format and a size of a new downlink (DL) DCI format with a first DCI size; and
        aligning a size of a legacy UL DCI format and a size of a legacy DL DCI format with a second DCI size, based on i) aligning the size of the new UL DCI format and the size of the new DL DCI format with the first DCI size and ii) a total number of different DCI sizes to be monitored by the UE exceeding a predetermined number for a cell,
    wherein each of the new UL DCI format and the legacy UL DCI format is a DCI format used to schedule a physical uplink shared channel (PUSCH), and
    wherein each of the new DL DCI format and the legacy DL DCI format is a DCI format used to schedule a physical downlink shared channel (PDSCH).

10. The method of claim 9,
    wherein the first DCI size is one of the size of the new UL DCI format and the size of the new DL DCI format, and wherein the second DCI size is one of the size of the legacy UL DCI format and the size of the legacy DL DCI format.

11. The method of claim 9, wherein the new UL DCI format is configured to include or not to include at least one field having a fixed field size among fields in the legacy UL DCI format.

12. The method of claim 9, wherein the new DL DCI format is configured to include or not to include at least one field having a fixed field size among fields in the legacy DL DCI format.

13. The method of claim 9, wherein aligning the size of the legacy UL DCI format and the size of the legacy DL DCI format with the second DCI size includes determining the second DCI size based on the size of the legacy UL DCI format and the size of the legacy DL DCI format, based on:
  i) determining the first DCI size based on the size of the new UL DCI format and the size of the new DL DCI format, and
  ii) non-fulfillment of conditions after aligning the size of the new UL DCI format with the size of the new DL DCI format to be the first DCI size, and
wherein the conditions comprise conditions that:
  a total number of different DCI sizes configured to be monitored by the UE is not larger than X+1 for the cell, and
  a total number of different DCI sizes configured to be monitored by the UE with a cell radio network temporary identifier (C-RNTI) is not larger than X for the cell.

14. The method of claim 13, wherein the legacy UL DCI format is DCI format 0_1, and the new UL DCI format is a DCI format different from DCI format 0_0 and the DCI format 0_1, and wherein the legacy DL DCI format is DCI format 1_1, and the new DL DCI format is a DCI format different from DCI format 1_0 and the DCI format 1_1.

15. The method of claim 9, wherein receiving the at least one DCI comprises: monitoring DCI of the new UL DCI format or DCI of the new DL DCI format based on the first DCI size.

16. The method of claim 9, wherein aligning the size of the new UL DCI format and the size of the new DL DCI format includes aligning the size of the new UL DCI format and the size of the new DL DCI format, based on:
  i) aligning a size of DCI format 0_0 and a size of DCI format 1_0 with a third DCI size, and
  ii) non-fulfillment of conditions after aligning the size of DCI format 0_0 and the size of DCI format 1_0 with the third DCI size, and
wherein the conditions comprise conditions that:
  a total number of different DCI sizes configured to be monitored by the UE is not larger than X+1 for the cell, and
  a total number of different DCI sizes configured to be monitored by the UE with a cell radio network temporary identifier (C-RNTI) is not larger than X for the cell.

17. A user equipment (UE) configured to receive downlink control information (DCI) in a wireless communication system, the UE comprising:
  at least one transceiver;
  at least one processor; and
  at least one computer memory operably connected to the at least one processor and configured to store instructions for causing, when executed, the at least one processor to perform operations comprising:
    performing DCI size alignment to adjust DCI sizes of DCI formats to be monitored by the (UE); and
    receiving at least one DCI based on the DCI size alignment,
  wherein performing the DCI size alignment comprises:
    aligning a size of a new uplink (UL) DCI format and a size of a new downlink (DL) DCI format with a first DCI size; and
    aligning a size of a legacy UL DCI format and a size of a legacy DL DCI format with a second DCI size, based on i) aligning the size of the new UL DCI format and the size of the new DL DCI format with the first DCI size and ii) a total number of different DCI sizes to be monitored by the UE exceeding a predetermined number for a cell,
  wherein each of the new UL DCI format and the legacy UL DCI format is a DCI format used to schedule a physical uplink shared channel (PUSCH), and
  wherein each of the new DL DCI format and the legacy DL DCI format is a DCI format used to schedule a physical downlink shared channel (PDSCH).

18. The UE of claim 17, wherein aligning the size of the new UL DCI format and the size of the new DL DCI format includes aligning the size of the new UL DCI format and the size of the new DL DCI format, based on:
  i) aligning a size of DCI format 0_0 and a size of DCI format 1_0 with a third DCI size, and
  ii) non-fulfillment of conditions after determining the third DCI size based on the size of DCI format 0_0 and the size of DCI format 1_0 with the third DCI size, and
wherein the conditions comprise conditions that:
  a total number of different DCI sizes configured to be monitored by the UE is not larger than X+1 for the cell, and
  a total number of different DCI sizes configured to be monitored by the UE with a cell radio network temporary identifier (C-RNTI) is not larger than X for the cell.

* * * * *